(12) United States Patent
Che et al.

(10) Patent No.: US 12,053,709 B2
(45) Date of Patent: Aug. 6, 2024

(54) PUZZLE PLATFORM

(71) Applicants: Xiaoling Che, Hubei (CN); Xiaoyi Che, Hubei (CN)

(72) Inventors: Xiaoling Che, Hubei (CN); Xiaoyi Che, Hubei (CN)

(*) Notice: Subject to any disclaimer, the term of this patent is extended or adjusted under 35 U.S.C. 154(b) by 0 days.

(21) Appl. No.: 18/530,402

(22) Filed: Dec. 6, 2023

(65) Prior Publication Data
US 2024/0108973 A1   Apr. 4, 2024

Related U.S. Application Data

(63) Continuation-in-part of application No. 18/235,416, filed on Aug. 18, 2023, and a continuation-in-part of application No. 17/829,359, filed on Jun. 1, 2022, and a continuation-in-part of application No. 17/505,587, filed on Oct. 19, 2021, now Pat. No. 11,890,551.

(30) Foreign Application Priority Data

Sep. 26, 2021 (CN) .......................... 202111131554.1
Sep. 26, 2021 (CN) .......................... 202122334815.1
Jun. 13, 2023 (CN) .......................... 202330364018.X

(51) Int. Cl.
*A63F 9/10* (2006.01)
*A63F 3/00* (2006.01)
*A47B 25/00* (2006.01)

(52) U.S. Cl.
CPC ........ *A63F 9/1044* (2013.01); *A63F 3/00261* (2013.01); *A47B 25/00* (2013.01); *A63F 2003/00274* (2013.01); *A63F 2003/00952* (2013.01)

(58) Field of Classification Search
CPC .............. A63F 9/1044; A63F 2009/105; A63F 3/00261; A63F 2003/00274; A63F 2003/00952; A47B 25/00; A47B 13/083; A47B 37/00
See application file for complete search history.

(56) References Cited

U.S. PATENT DOCUMENTS

| | | | | |
|---|---|---|---|---|
| 1,987,496 A | * | 1/1935 | Springborn | A63F 9/1044 273/157 R |
| 2,174,613 A | * | 10/1939 | Blaschke | A47B 3/0912 221/256 |
| 4,513,974 A | * | 4/1985 | Lin | A63F 3/0023 273/287 |
| 4,635,894 A | | 1/1987 | Sammons | |
| 4,645,209 A | * | 2/1987 | Goulter | A63F 3/02 273/287 |
| 4,659,050 A | | 4/1987 | Tabayashi | |

(Continued)

*Primary Examiner* — Nkeisha Smith

(57) ABSTRACT

A puzzle platform includes two puzzle drawers, a puzzle board and a support assembly configured to support the puzzle board and having a receiving space cooperatively with the puzzle board. The support assembly includes a supporting member having a top wall, a partition wall configured to forming a pair of openings communicated with the receiving space cooperatively with the top wall. Each of the puzzle drawers is actuated to slide in-and-out of the receiving space through the openings. The partition wall is integral with the top wall, so that the manufacture of the puzzle platform is simple and low-cost.

10 Claims, 22 Drawing Sheets

(56) References Cited

U.S. PATENT DOCUMENTS

| | | | | |
|---|---|---|---|---|
| 4,865,325 A * | 9/1989 | Stolz | ............ | A63F 9/1044 |
| | | | | 273/157 R |
| 5,174,538 A | 12/1992 | Okada | | |
| 5,451,050 A * | 9/1995 | Charles | ............ | A63F 3/00041 |
| | | | | 473/588 |
| 6,769,538 B2 * | 8/2004 | Oswald | ............ | A47K 5/00 |
| | | | | 220/571 |
| 7,552,821 B1 * | 6/2009 | Demers | ............ | A63F 9/1044 |
| | | | | 206/499 |
| 7,607,699 B2 * | 10/2009 | Langford | ............ | A45C 3/02 |
| | | | | 190/110 |
| 9,044,688 B1 * | 6/2015 | Janay | ............ | B65D 25/22 |
| 2010/0101461 A1 | 4/2010 | Brault et al. | | |
| 2017/0087454 A1 * | 3/2017 | Reichmuth | ............ | A63F 3/02 |
| 2021/0170267 A1 | 6/2021 | Malki | | |
| 2021/0170268 A1 * | 6/2021 | Malki | ............ | A63F 9/1044 |

\* cited by examiner

PUZZLE PLATFORM

CROSS REFERENCES AND PRIORITIES

This application is a continuation-in-part of U.S. patent application Ser. No. 17/505,587 filed on Oct. 19, 2021 which claims the benefit of Chinese Patent Application Nos. 2021111315541 and 2021223348151 filed on Sep. 26, 2021, U.S. patent application Ser. No. 17/829,359 filed on Jun. 1, 2022, U.S. patent application Ser. No. 18/235,416 filed on Aug. 18, 2023 which claims the benefit of Chinese Patent Application No. 202330364018X filed on Jun. 13, 2023, the contents of each of which are incorporated by reference in their entirety.

BACKGROUND OF THE PRESENT INVENTION

Field of Invention

The present invention relates to puzzle game apparatus, and more particularly to a puzzle platform, wherein the puzzle platform is configured for retaining all the unfinished pieces and while allowing the player to conveniently play the puzzle.

Description of Related Arts

Puzzles are devised over the years and are among the most popular board games generally played alone by an individual. It is well known that puzzles are good for the brain. Studies have shown that playing puzzles can improve cognition and visual-spatial reasoning, and can train concentration and patience.

Other than as a means of entertainment and enjoyment, players would like to challenge themselves by playing higher piece counts of the puzzle. Generally speaking, the higher the piece count, the harder the puzzle is. However, a common drawback or a burden for the player is that the finished size of the puzzles is relatively large. For example, a finished size of 1,000 piece puzzles is about 30"×24", a finished size of 5,000 piece puzzles is about 60"×40", and so on. It could take hours, days or even months to compete a larger scale puzzle. One or more puzzle pieces could be missed accidentally or unintentionally. It is said that the player usually finds out there is a missing piece at the end. Furthermore, as a skilled player, the strategies for playing such huge size of puzzles are configured for classifying puzzle pieces by different feature such as puzzle pieces with a particular color or shape and preassembling a group of puzzle pieces. Therefore, how to avoid losing any pieces and classifying different puzzle pieces with preassembling puzzle groups, it is best to find a container to save and classify all the unfinished pieces.

U.S. Pub. No. US20210170267A1 describes a jigsaw puzzle on which the puzzle pieces are assembled. Referring to FIG. 2, a perimeter edge 18 and a first side edge 22 is a type of two-piece and a multi-layer structure. The perimeter edge 18 is stacked on the first side edge 22 and a drawer 40 positioned such that it is extendable outwardly away from the first side edge 22. In order to assemble the drawer 40, the perimeter edge 18 and the first side edge 22 should be placed at an appropriate location. However, in order to place the perimeter edge 18 and the first side edge 22 precisely at specific location, the locations of the perimeter edge 18 and the first side edge 22 should be adjusted repeatedly. So, the perimeter edge 18 and a first side edge 22 must be assembled together by additional assembly steps, which complicates the manufacturing process. Therefore, the jigsaw puzzle has complicated structures and is difficult to be manufactured with low cost.

A need exists for a tool that retains all the unfinished pieces classified. It is to the provision of such a tool that the present disclosure is primarily directed.

SUMMARY OF THE PRESENT INVENTION

The invention is advantageous in that it provides a puzzle platform, wherein the puzzle platform is configured for allowing a player to classify and store unfinished puzzles in the process of playing puzzles. The puzzle platform includes two puzzle drawers, a puzzle board having a playing portion configured for playing a plurality of puzzle pieces thereon and a support assembly configured to support the puzzle board, defining a receiving space cooperatively with the puzzle board and comprising a supporting member which comprises a top wall and a partition wall configured to forming a pair of openings communicated with the receiving space cooperatively with the top wall. Each of the puzzle drawers is actuated to slide in-and-out of the receiving space through the openings. The partition wall is integral with the top wall.

Optionally, the support assembly further comprises a first extending member and a second extending member spaced apart from the first extending member in an extension direction of the supporting member. The supporting member further comprises a first side wall connected to an end of the top wall and the first extending member and a second side wall connected to the other end of the top wall and the second extending member. The first side wall and the second side wall are integral with the top wall.

Optionally, the first extending member is integral with the first side wall and the second extending member is integral with the second side wall to form a one-piece structure.

Optionally, the puzzle board comprises a puzzle plate supported on the support assembly. The puzzle plate, the first extending member, the second extending member, the top wall, the first side wall, the second side wall, and the partition wall are integrated with each other to form a monolithic structure.

Optionally, the supporting member further comprises a first engaging portion extending from the first side wall. The first extending member comprises a first engaging frame disposed below the puzzle board and engaged with the first engaging portion.

Optionally, the supporting member further comprises a first abutting portion positioned between the first side wall and the first engaging portion and abutting against the first extending member.

Optionally, the first extending member comprises a first engaging frame comprising a first engaging groove engaged with the first engaging portion and a first clamping structure extending from the first engaging frame and configured to fix the puzzle plate cooperatively with the first engaging frame.

Optionally, the first clamping structure comprises a first clamping wall connected to the first engaging frame, a second clamping wall connected to the first clamping wall and spaced apart from the first engaging frame, and a third clamping wall bent from the second clamping wall in a direction close to the first engaging frame, wherein the puzzle plate is sandwiched between the third clamping wall and the first engaging frame.

Optionally, the support assembly further comprises a reinforcing member, the reinforcing member is disposed below the puzzle board and located between the first extending member and the second extending member; the reinforcing member comprises a reinforcing frame engaged with the partition wall.

Optionally, the supporting member further comprises an inserting portion disposed at a side of the partition wall facing the reinforcing member, and the inserting portion is detachably inserted into the reinforcing member.

Optionally, the supporting member further comprises an inserting groove disposed at a side of the partition wall facing the reinforcing member, and the reinforcing member comprises a second inserting portion detachably inserted into the inserting groove.

Optionally, the support assembly further comprises a first stopping element disposed on the reinforcing member at a side facing the corresponding puzzle drawer; and the puzzle drawers abut against the first stopping element in an accommodating state.

Optionally, the support assembly further comprises a reinforcing member disposed below the puzzle board and located between the first extending member and the second extending member; the reinforcing member comprises limiting bars and the corresponding puzzle drawers comprises limiting grooves matching with the limiting bars.

Optionally, each of the puzzle drawers comprises a drawer body and a tab extending from the drawer body, and the supporting member further comprise a recess for accommodating the tab.

Optionally, the supporting member further comprises a bottom wall spaced apart from the top wall, a first side wall, connected to both the bottom wall and the top wall at an end of the top wall, and a second side wall, connected to both the bottom wall and the top wall at the opposite end of the top wall. The bottom wall is integral with the partition wall, the first side wall, and the second side wall.

In another aspect, the present invention provides another puzzle platform comprising a puzzle board having a playing portion configured for playing a plurality of puzzle pieces thereon and a support assembly configured to support the puzzle board and comprising a supporting member which comprises an upper part configured to receive the puzzle board and a middle part integrally extending from the upper part and positioned below the puzzle board for supporting the puzzle board together with the upper part.

Optionally, the support assembly further comprises a first extending member and a second extending member spaced apart from the first extending member in an extension direction of the supporting member. The middle part of the supporting member further comprises a first side wall, connected to the upper part and the first extending member and a second side wall connected to the upper part and the second extending member and a partition wall, connected to the upper part and spaced apart from the first and second side walls.

Optionally, the middle part of the supporting member further comprises a first engaging portion extending from the first side wall; the first extending member comprises a first engaging frame disposed below the puzzle board and engaged with the first engaging portion.

Optionally, the supporting member further comprises a first abutting portion positioned between the first side wall and the first engaging portion, and abutting against the first extending member.

In the other aspect, the present invention provides a puzzle platform comprising two puzzle drawers, a puzzle board having a playing portion configured for playing a plurality of puzzle pieces thereon and a support assembly configured to support the puzzle board and comprising a pair of supporting members spaced apart from each other and a pair of extending members spaced apart from each other and detachably inserted into the pair of supporting members. Each of the supporting members comprises a top wall, a partition wall, configured to forming a pair of openings communicated with the receiving space cooperatively with the top wall. Each of the puzzle drawers is actuated to slide in-and-out of the receiving space through the openings. The partition wall is integral with the top wall.

Still further objects and advantages will become apparent from a consideration of the ensuing description and drawings. These and other objectives, features, and advantages of the present invention will become apparent from the following detailed description, the accompanying drawings, and the appended claims.

DETAILED DESCRIPTION OF THE PREFERRED EMBODIMENTS

Figure 1:
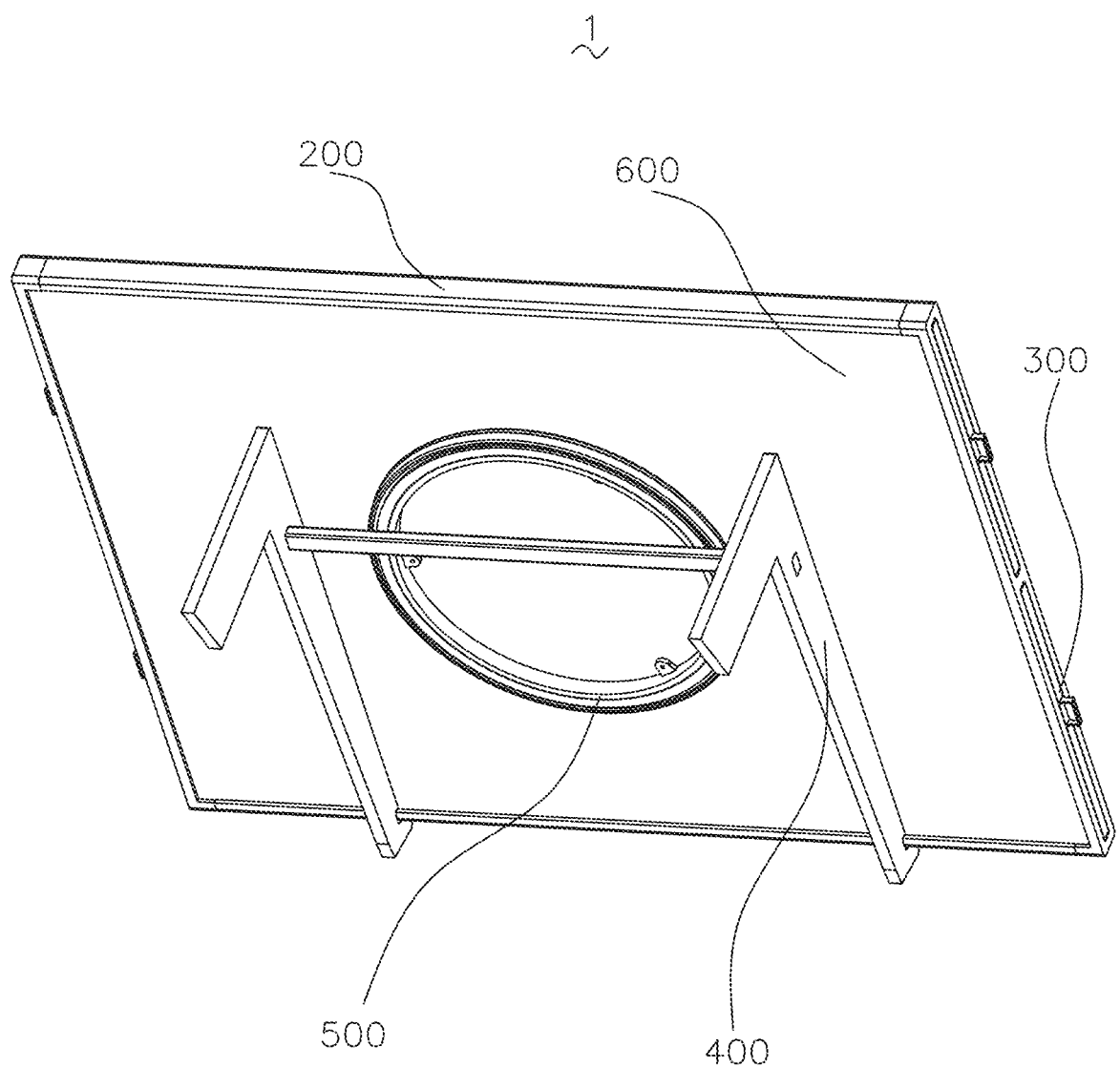
FIG. 1 is an illustrative isometric view of a puzzle platform according to a first embodiment of the present invention.
Figure 2:
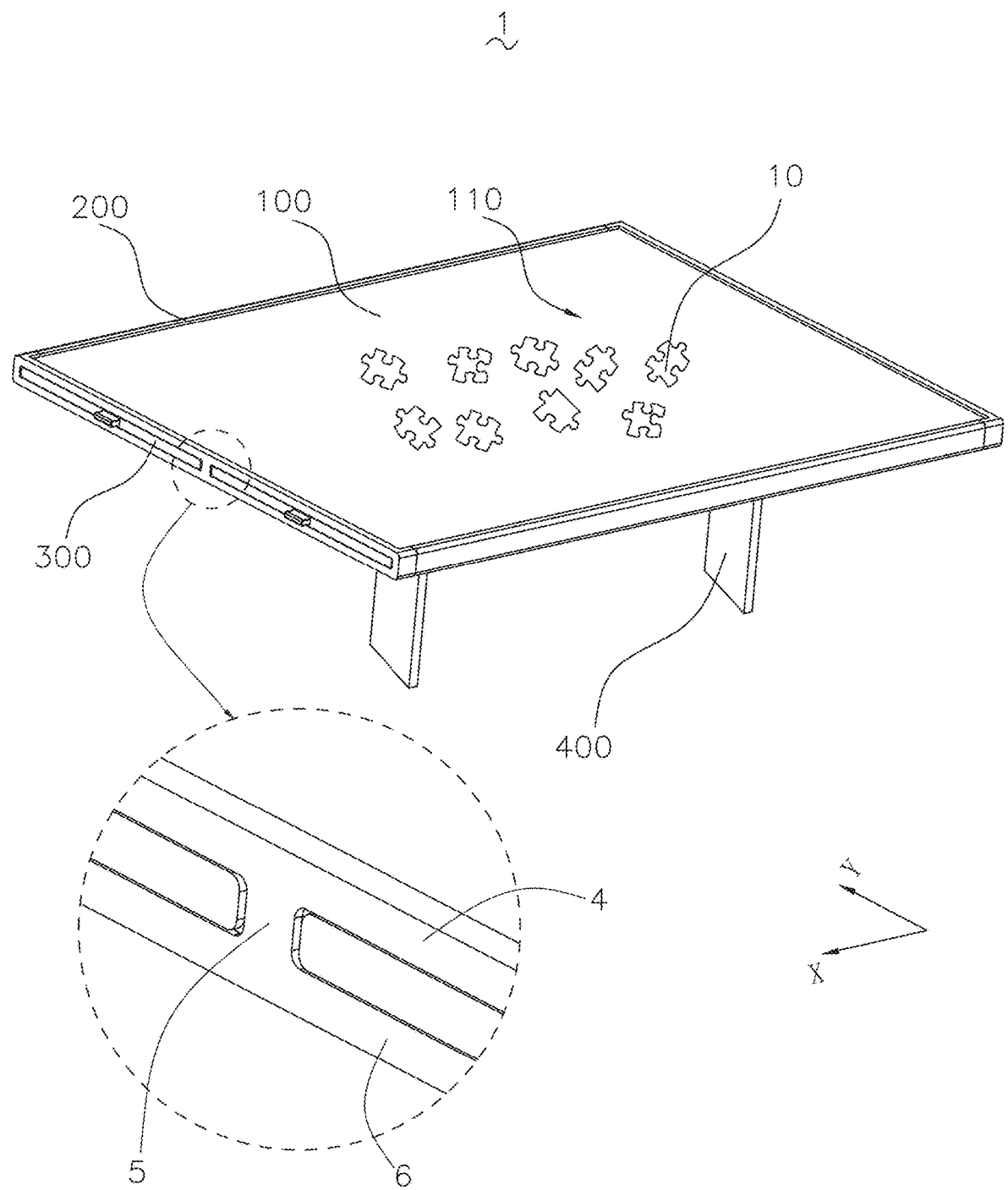
FIG. 2 is an illustrative isometric view of the restricting wall and the supporting portion of the puzzle platform shown in FIG. 1, but from another aspect.
Figure 3:
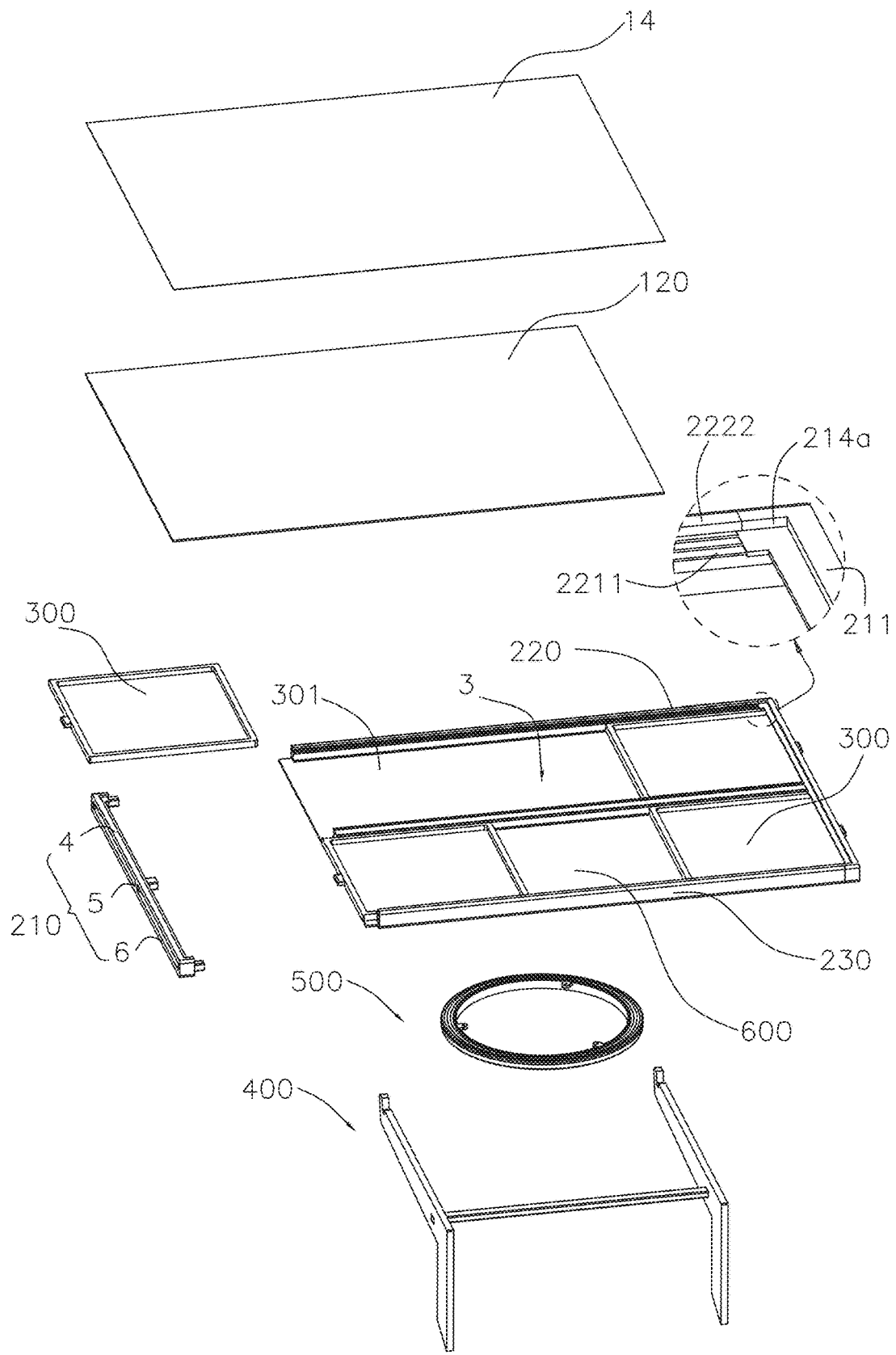
FIG. 3 is a partly exploded perspective view of the puzzle platform shown in FIG. 1.
Figure 4:
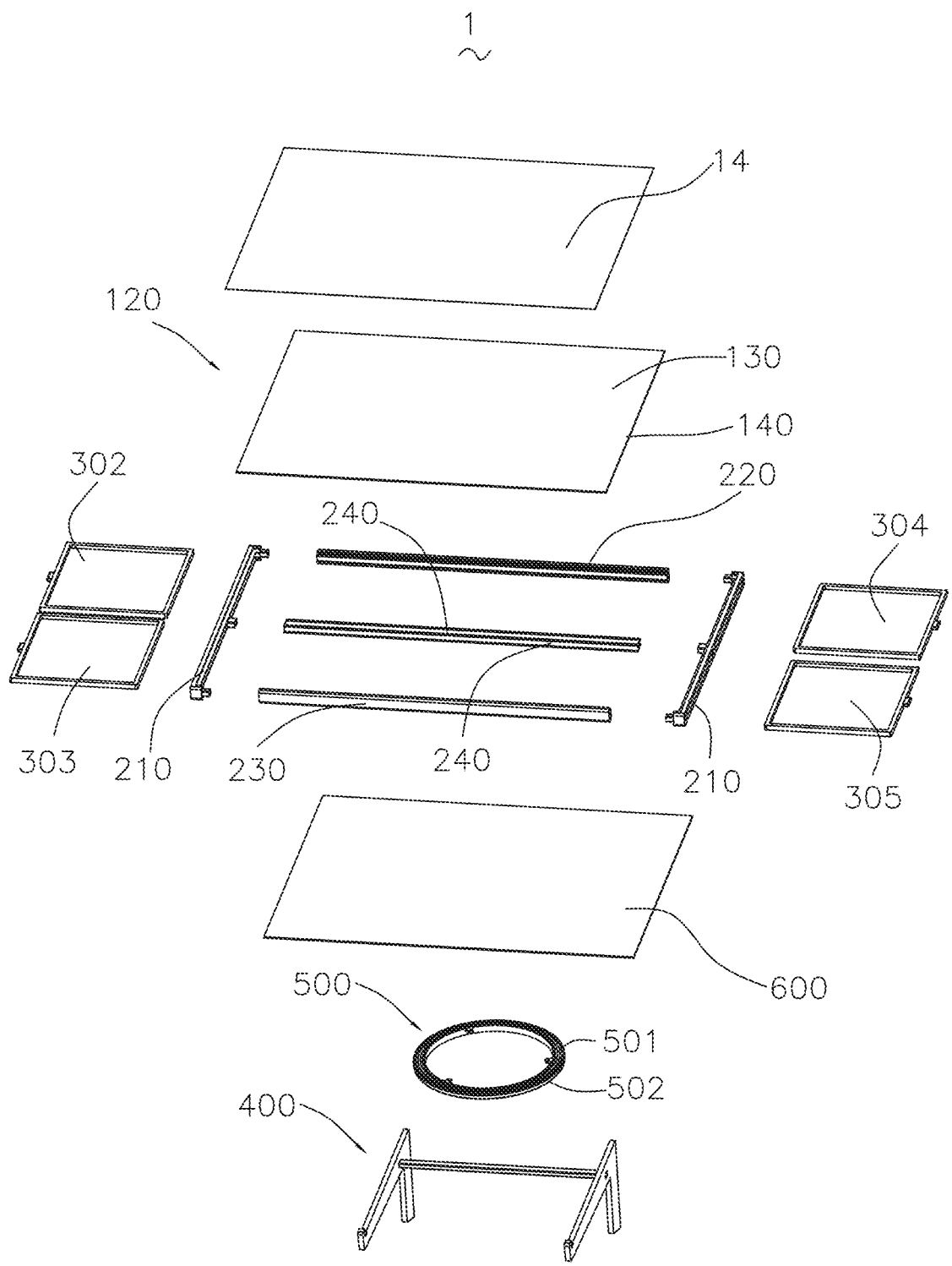
FIG. 4 is an exploded perspective view of the puzzle platform shown in FIG. 1.
Figure 5:
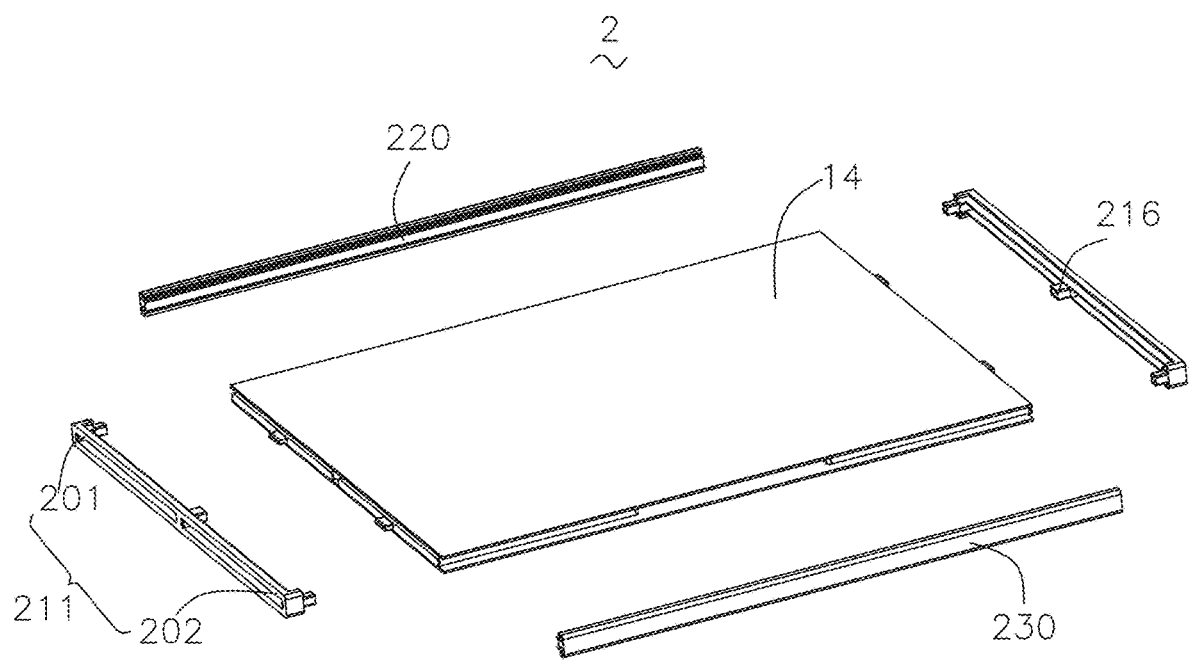
FIG. 5 is a partly exploded perspective view of a board assembly of the puzzle platform shown in FIG. 1.
Figure 6:
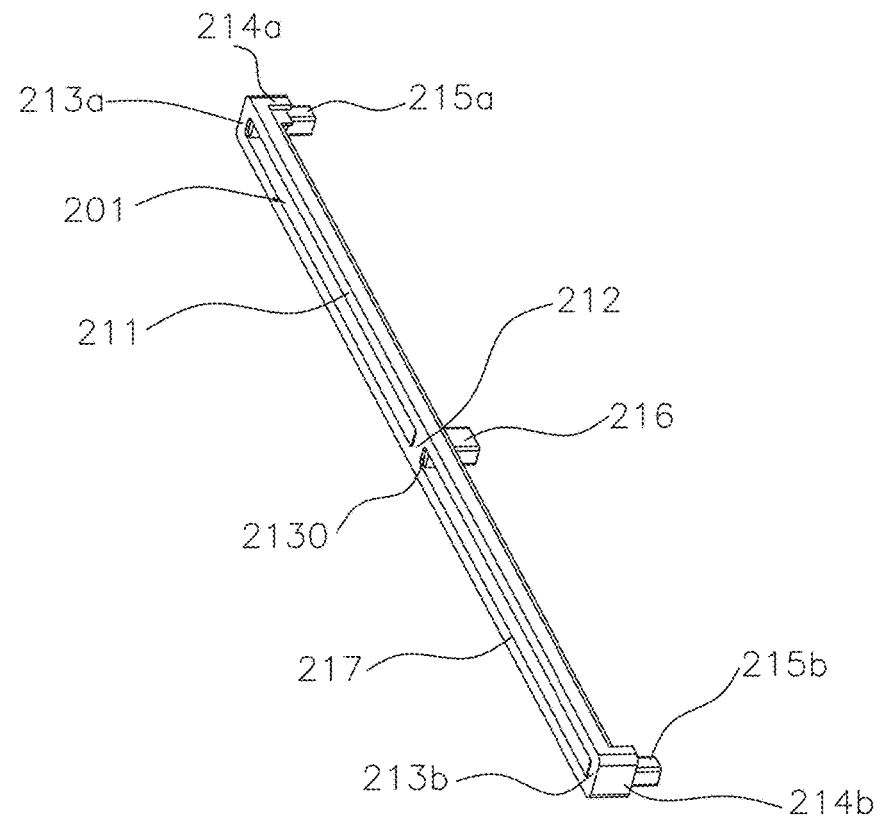
FIG. 6 is an illustrative isometric view of a supporting member of the puzzle platform shown in FIG. 1.
Figure 7:
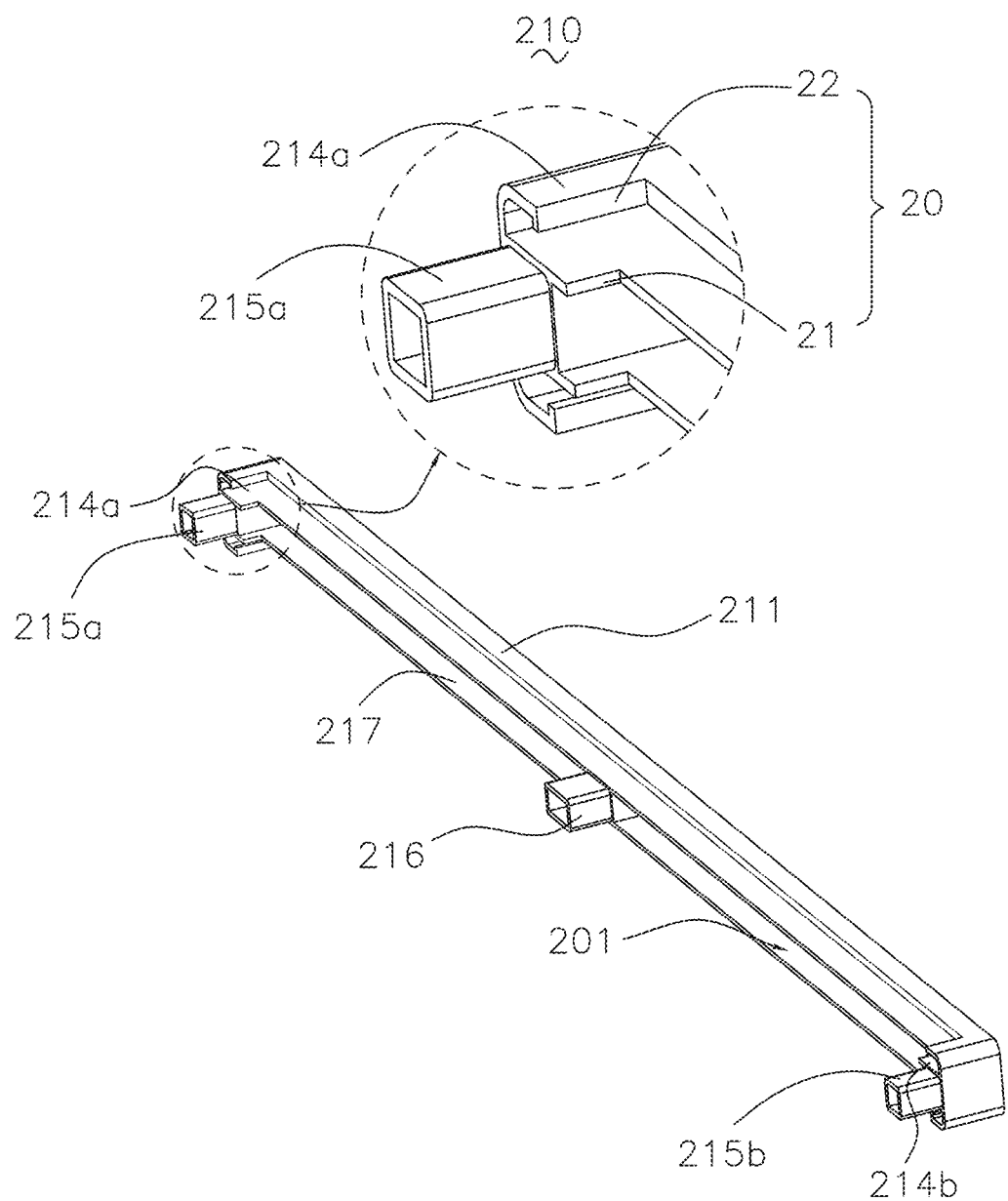
FIG. 7 is an illustrative isometric view of a supporting member of the puzzle platform shown in FIG. 1, but from another aspect.
Figure 8:
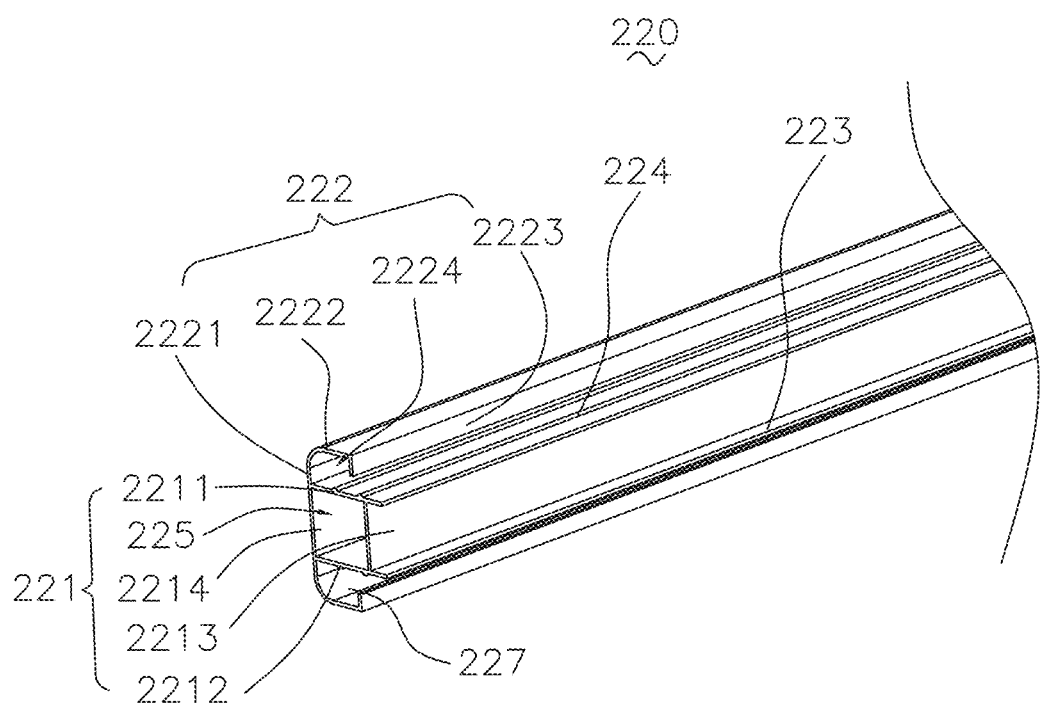
FIG. 8 is an illustrative isometric view of a first extending member of the puzzle platform shown in FIG. 1.
Figure 9:
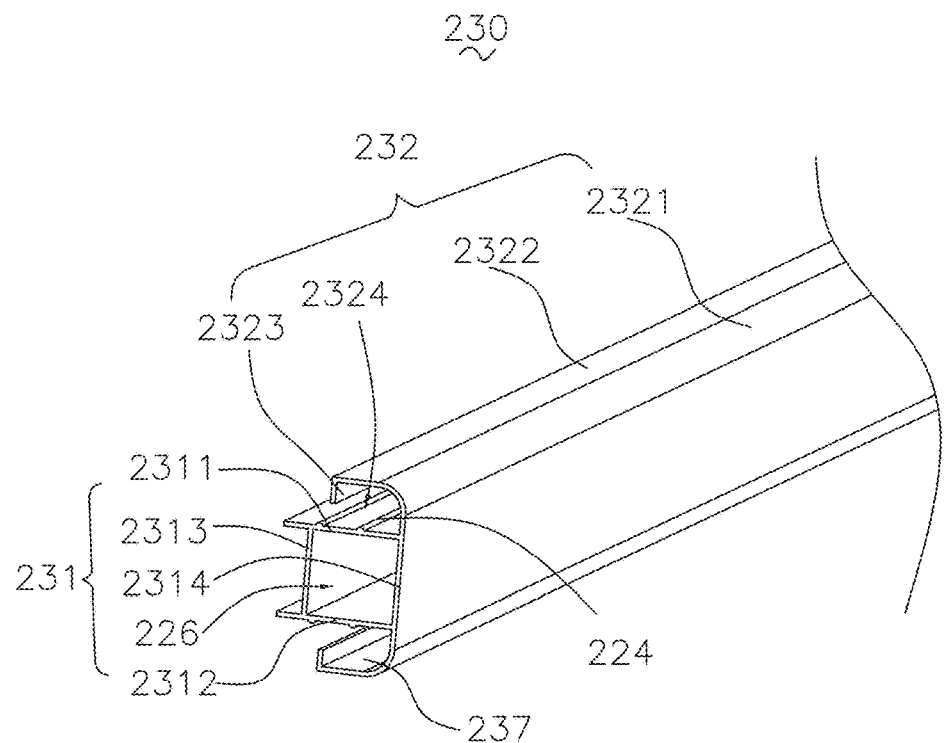
FIG. 9 is an illustrative isometric view of a second extending member of the puzzle platform shown in FIG. 1.

The following description is disclosed to enable any person skilled in the art to make and use the present invention. Preferred embodiments are provided in the following description only as examples and modifications will be apparent to those skilled in the art. The general principles comprised in the following description would be applied to other embodiments, alternatives, modifications, equivalents, and applications without departing from the spirit and scope of the present invention.

Referring to FIGS. 1-18, a puzzle platform 1 is arranged for a user or a player to assemble a plurality of puzzle pieces 10 thereon and includes a board assembly 2, a rotating assembly 500 attached on the board assembly 2, and a bracket 400 disposed below the board assembly 2 and detachably connected to the board assembly 2.

The board assembly 2 comprises a puzzle board 100 configured for placing the puzzle pieces 10, a support assembly 200 supporting the puzzle board 100 for forming a receiving space 3 cooperatively with the puzzle board 100, and a base 600 attached on the support assembly 200, at least two puzzle drawers 300 received in the receiving space 3. The rotating assembly 500 is configured to provide accessibility for the board assembly 2 to move the board assembly 2 at different directions with respect to a playing place. The board assembly 2 is embodied to have a rectangular shape having two longer longitudinal sides provided along a longitudinal direction X and two shorter transverse sides provided along a lateral direction Y perpendicular to the longitudinal direction X. Although good results have been shown with the board assembly 2 that is rectangular in shape, it is within the scope of the present invention that numerous other shapes of the board assembly 2 could be used to achieve the desired functionality as described herein.

The puzzle board 100 as shown is a rectangular board, which can be adapted to fit most of the puzzle patterns available on the market, however, within the scope of the present invention, many other shapes of puzzle boards can be used to fulfill the functions described herein, and the puzzle boards of uniform thickness can be of any shape, such as round, square, rectangular, and so on. The puzzle board 100 comprises a puzzle plate 120 and an anti-slipping layer 14 attached on the puzzle plate 120. The puzzle plate 120 includes a playing portion 130 for playing the puzzle pieces 10 thereon and a fixing portion 140 extending from the edge of the playing portion 130 and fixed by the support assembly 200. It is worth mentioning that an area of the playing portion 130 is not smaller than an area of the puzzle pieces 10 being put together. Preferably, the area of the playing portion 130 matches with the area of the puzzle pieces 10 after the puzzle pieces 10 are assembled. In other words, the puzzle board 100 serves as a puzzle frame for framing the puzzle pieces 10 after the puzzle pieces 10 are assembled. It is worth mentioning that the puzzle board 100 has a predetermined size adapted for a larger scale puzzle, such as at least 1,000 puzzle pieces, being assembled on the puzzle board 100. Preferably, the anti-slipping layer 14 has a self-adhesive bottom surface adhered on the puzzle plate 120, wherein the anti-slipping layer 14 can be removed from the puzzle plate 120 without damaging the puzzle plate 120 and the anti-slipping layer 14. Therefore, the anti-slipping layer 14 is reusable to place on the puzzle plate 120. Furthermore, the anti-slipping layer 14 serves as a backing layer of the puzzle pieces 10 after the puzzle pieces 10 are assembled. The flat puzzle plate 120 is made of non-slip felt surfaces to keep the puzzle pieces 10 and prevent the puzzle pieces 10 being slipped thereon. The area of the anti-slipping layer 14 matches with the area of the puzzle plate 120. It's optional that the area of the anti-slipping layer 14 matches with the area of the puzzle plate 120. The anti-slipping layer 14 is made of a plastic sheet, a silicone sheet, a transparent sheet, an opaque sheet, or a flexible sheet, and so on for retaining the puzzle pieces 10.

As shown in FIGS. 1-18, the support assembly 200 is coupled with the puzzle plate 120 for forming at least two drawer cavities 301 and at least two puzzle drawers 300 received in the corresponding drawer cavities 301. The puzzle board 100 of the puzzle platform 1 has a thin and big size. A length and/or a width of the puzzle board 100 is much greater than a thickness of the puzzle board 100, so the support assembly 200 is configured for improving the structural strength of the puzzle board 100. The support assembly 200 is substantially perpendicular to the puzzle board 100 and may take any shape, such as circular, square, rectangular and so on.

The support assembly 200 comprises a pair of supporting members 210 formed at the transverse sides of the puzzle board 100, a first extending member 220 connected with an end of the pair of supporting members 210 and a second extending member 230 spaced apart from the first extending member 220 in an extension direction of the supporting member 210 and connected with the other end of the pair of supporting members 210. The pair of supporting members 210 is parallel to each other. The first extending member 220 is parallel to the second extending member 230.

Each of the supporting member 210 includes an upper part 4, a lower part 5 spaced apart from the upper part 4, and a middle part 6 connected the upper and lower parts 4, 5. It's optional that the lower part 5 can be omitted. Each of the supporting member 210 further comprises a top wall 211 arranged on the upper part 4 and connected to the puzzle board 100, a partition wall 212 arranged on the middle part 6 and extending from the middle of the top wall 211 and a bottom wall 217 arranged on the lower part 5, spaced apart from the top wall 211 and connected with the partition wall 212. The top wall 211 includes a first end 201 and second end 202 opposite to the first end 201. Each of the supporting member 210 further includes a first side wall 213a arranged on the middle part 6 and connected to the first end 201 of the top wall 211, the bottom wall 217 and the first extending member 220, a first abutting portion 214a arranged on the upper part 4, connected to the top wall 211 and a side of the first side wall 213a adjacent to the first extending member 220 and abutting against the first extending member 220, a first engaging portion 215a protruding from the first abutting portion 214a in a direction away from the first side wall 213a and engaged with the first extending member 220, a second side wall 213b arranged on the middle part 6 and connected to the second end 202 of the top wall 211, the bottom wall 217 and the second extending member 230, a second abutting portion 214b arranged on the upper part 4 and connected to the top wall 211 and a side of the second side wall 213b and abutting against the second extending member 230, and a second engaging portion 215b protruding from the second abutting portion 214b in a direction away from the second side wall 213b and engaged with the second extending member 230. The first abutting portion 214a, the first engaging portion 215a, and the first side wall 213a are integrated with each other to form a one-piece structure. The top wall 211, the bottom wall 217, the first side wall 213a, the second side wall 213b, and the partition wall 212 cooperatively comprise two openings 201, and a corresponding one of the puzzle drawers 300 is exposed outside the receiving space 3 through the corresponding opening 201.

In this embodiment, each of the supporting member 210 is a monolithic structure. The partition wall 212 is integral with the top wall 211. The first side wall 213a and the second side wall 213b is integral with the top wall 211. The bottom wall 217 is integral with the partition wall 212, the first side wall 213a, and the second side wall 213b. Further, the first abutting portion 214a, the first engaging portion 215a, and the first side wall 213a are integrated with each other to form a one-piece structure. The second abutting portion 214b, the second engaging portion 215b, and the second side wall 213b are integrated with each other to form a one-piece structure. That is, each of the supporting member 210 is a one-piece structure, and is not a laminated multi-layer structure, which makes the assembling process much easier, the service life of the device is increased, the support force applied on the puzzle plate 120 is increased, thereby greatly reducing material cost and assembly cost. Particularly, each of the supporting member 210 is a one-piece of plastic. The partition wall 212 and the top wall 211 are manufactured by injection molding, thereby forming an integral unit and placing the partition wall 212 precisely at specific location. There is no need to place and adjust the partition wall 212 precisely at specific location. So, it simplifies the manufacturing process of the board assembly 2. It's optional that at least one of the first side wall 213a and the second side wall 213b is integral with the top wall 211, which makes the assembling process much easier. The bottom wall 217 is integral with at least one of the partition wall 212, the first side wall 213a, or the second side wall 213b. In an alternative embodiment, the bottom wall, the first side wall, and the second side wall can be omitted. The partition wall 212 is integral with the top wall 211 for forming the pair of openings 201 communicated with the receiving space 3.

Referring to FIGS. 19-24, in another mode of a board assembly 2' of a puzzle platform 1', the board assembly 2' is a monolithic structure. A puzzle plate 120' and a support assembly 200' are manufactured by injection molding, thereby forming an integral unit, improving the mechanical strength of the board assembly 2' and reducing the assembly cost. Particularly, a puzzle plate 120', a first extending member 220', a second extending member 230', a top wall 211', a first side wall 213a', a second side wall 213b', and a partition wall 212' are integrated with each other to form the monolithic structure of the board assembly 2', which further reduces assembly cost and improves the mechanical strength of the board assembly 2'. The first extending member 220' and the second extending member 230' is integral with the top wall 211' to form a one-piece structure. Further, the first extending member 220' and the second extending member 230' is integral with the pair of the supporting member 210'. The first extending member 220' and the second extending member 230' is substantially strip-shaped, respectively. It's optional that at least one of the first extending member 220' and the second extending member 230' is integral with a corresponding one of the first side wall 213a' or second side wall 213b' to form a one-piece structure.

The support assembly 200' of the board assembly 2 'further comprises a plurality of reinforcing ribs 140' with different pattern integrally extended from the puzzle plate 120' to solve the problem of the distortion or deformation of the board assembly 2', a plurality of reinforcing members 240' integrally extended from the puzzle plate 120' for fixing puzzle drawers 300', and a plurality of coupling members 25' integrally extended from the puzzle plate 120' for fixing a base 600'. The reinforcing member 240' comprises a plurality of limiting bars 244' and the puzzle drawers 300' comprises a plurality of limiting groove 300a' matching with the limiting bar 244', so that the puzzle drawers 300' are easily and smoothly actuated to slide in-and-out of a receiving space 3' through the openings 201'. Preferably, the reinforcing member 240' further comprises a plurality of limiting openings 245' adjacent to the corresponding limiting bar 244' for providing the limiting bars 244' with good elasticity.

The coupling members 25' comprises three first groups 251' extending along the longitudinal direction X and at least one second group 252' extending along the lateral direction Y, thereby fixing the base 600' on the puzzle plate 120' firmly. The three first groups 251' have a same structure to another and spaced apart from another. Each of the first groups 251' comprises a plurality of longitudinal members 2511' intervally and integrally extended from the puzzle plate 120'. The second group 252' comprises a plurality of lateral members 2521' intervally and integrally extended from the puzzle plate 120. However, the amount of the first groups 251' is not limited or restricted to three, and according to different desires, amount of the first groups 251' can be various. The number of the second group 252' is not limited either one or two. The first groups 251' cooperate with the second group 252' for stabilizing and balancing the fixation of the base 600'.

Figure 22:
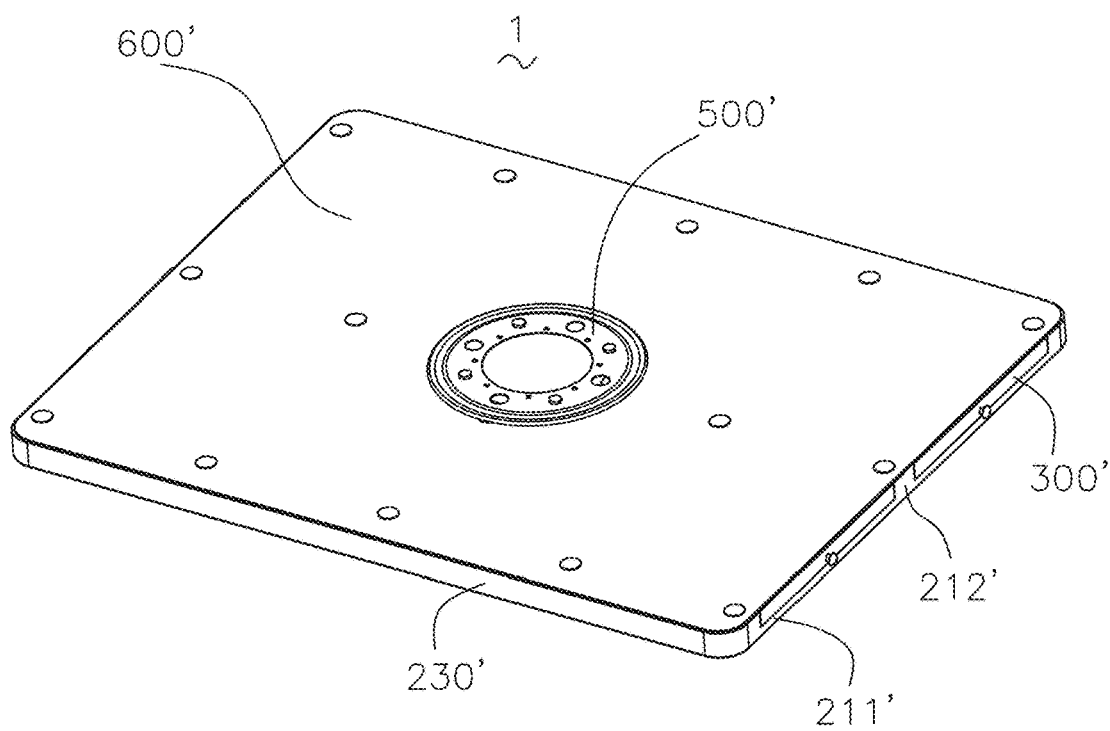
FIG. 22 is an illustrative isometric view of the puzzle platform shown in FIG. 13, but from another aspect.
Figure 23:
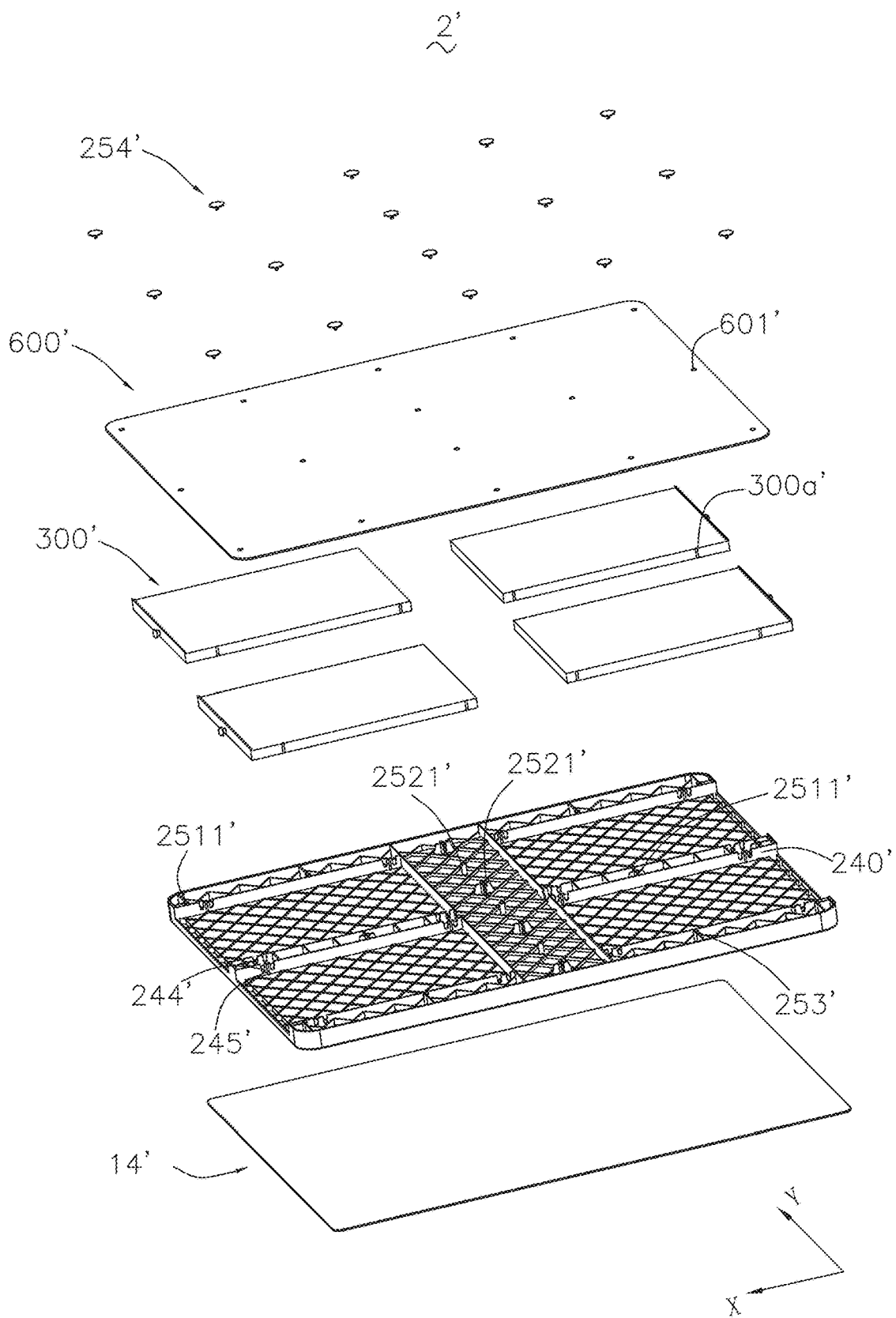
FIG. 23 is an exploded perspective view of the puzzle platform shown in FIG. 13.
Figure 24:
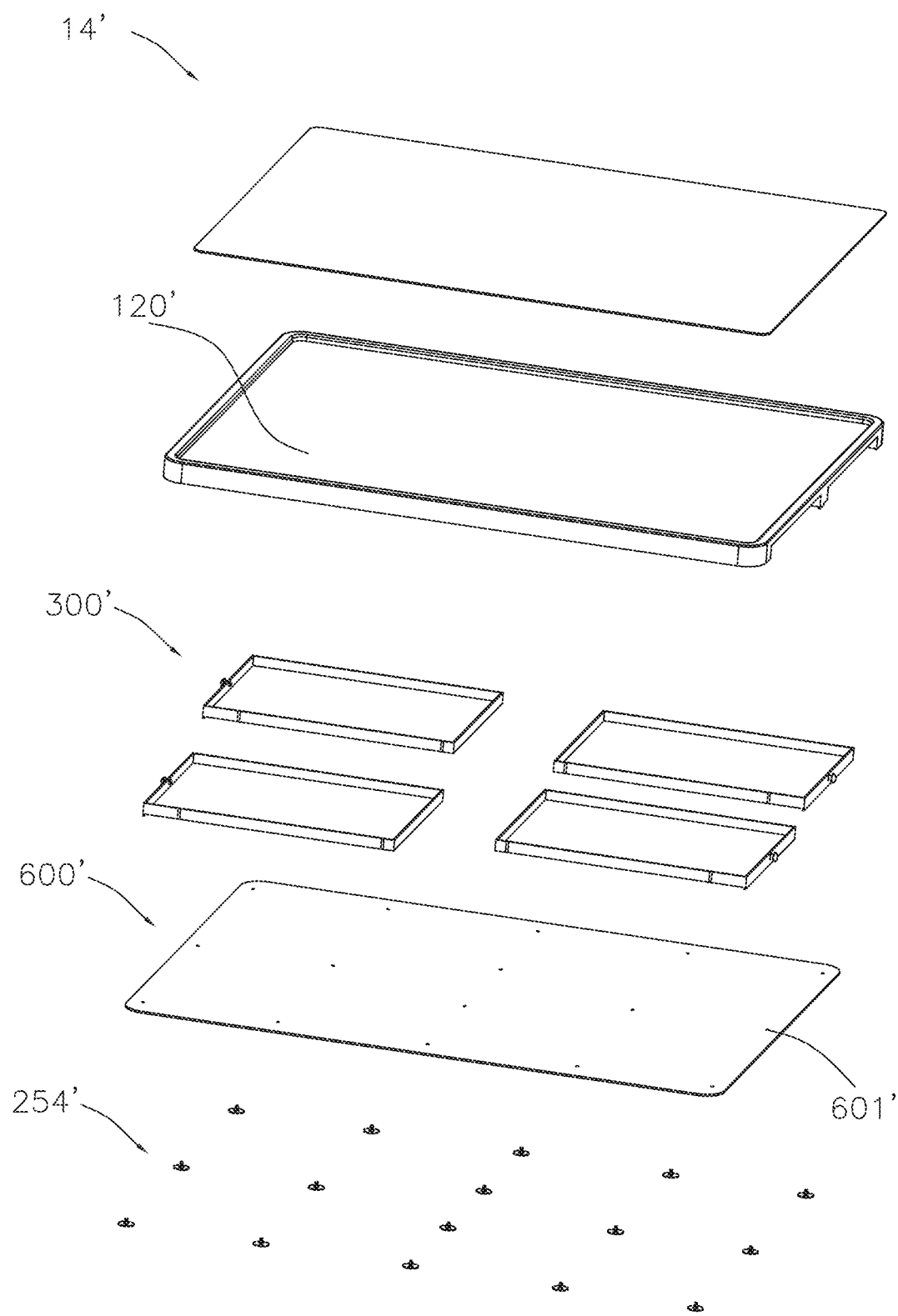
FIG. 24 is an exploded perspective view of the puzzle platform shown in FIG. 13, but from another aspect.
Figure 25:
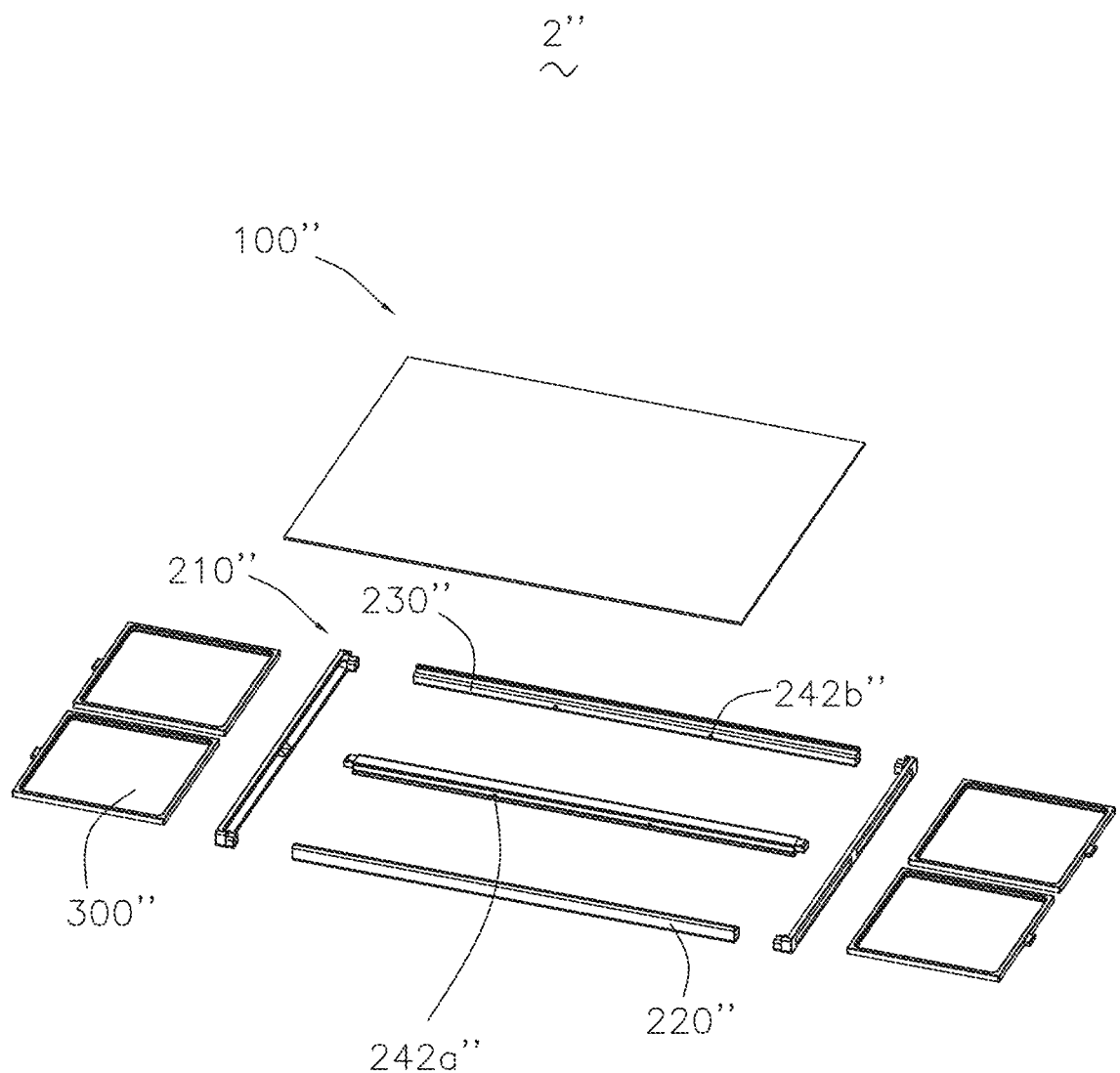
FIG. 25 is an exploded perspective view of a puzzle platform illustrating third mode of a board assembly.
Figure 26:
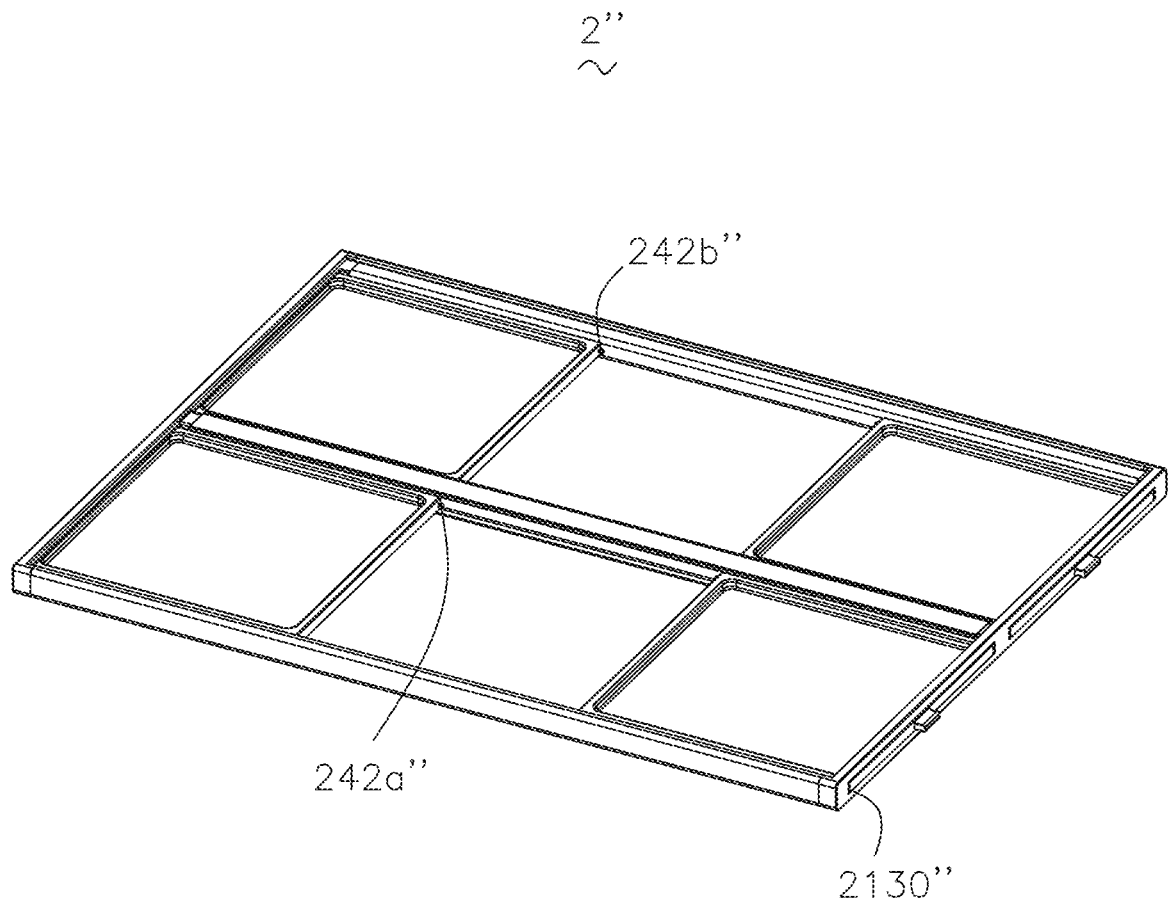
FIG. 26 is an illustrative isometric view of the puzzle platform shown in FIG. 25.
Figure 27:
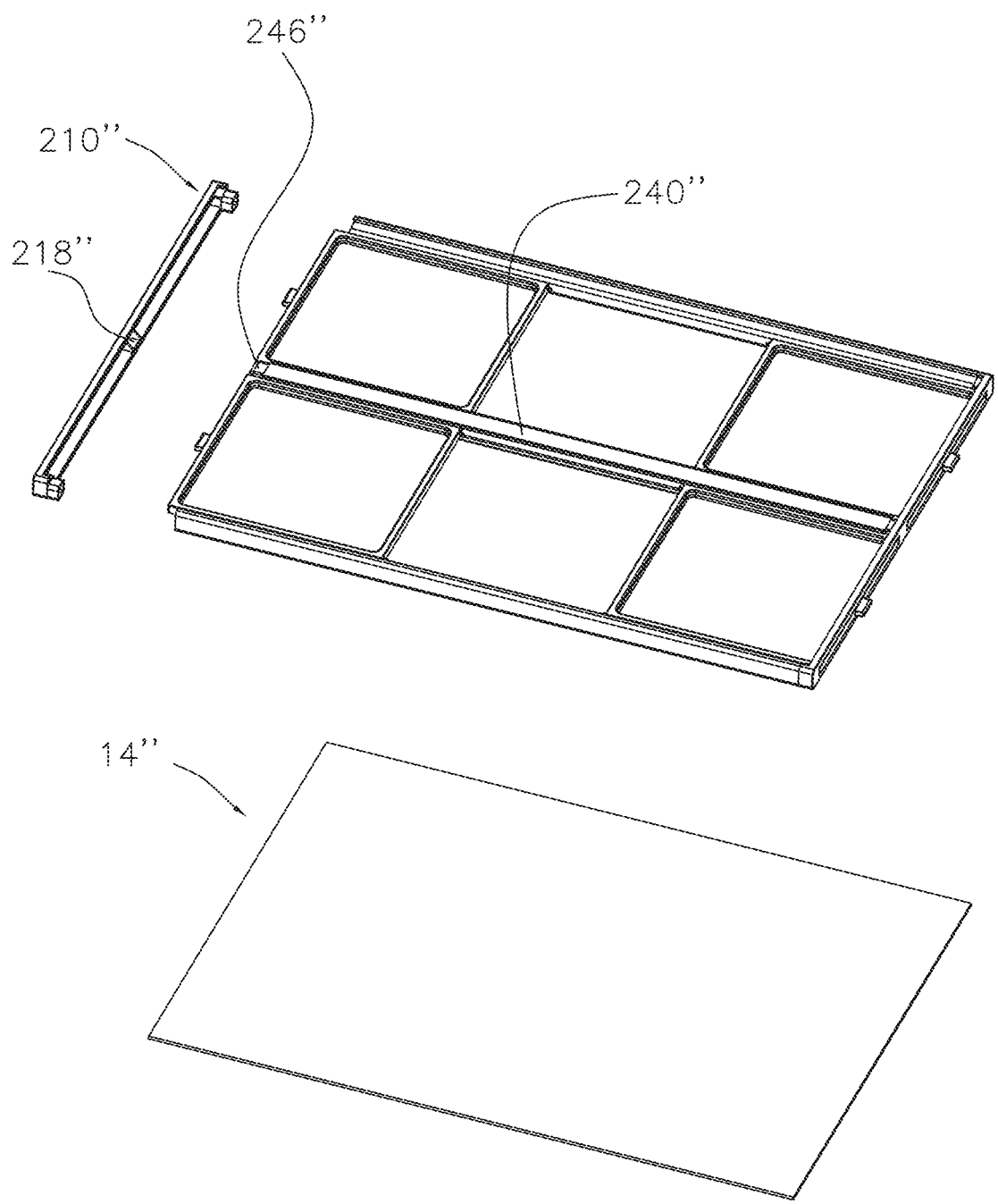
FIG. 27 is a partly exploded perspective view of the puzzle platform shown in FIG. 25.
Figure 28:
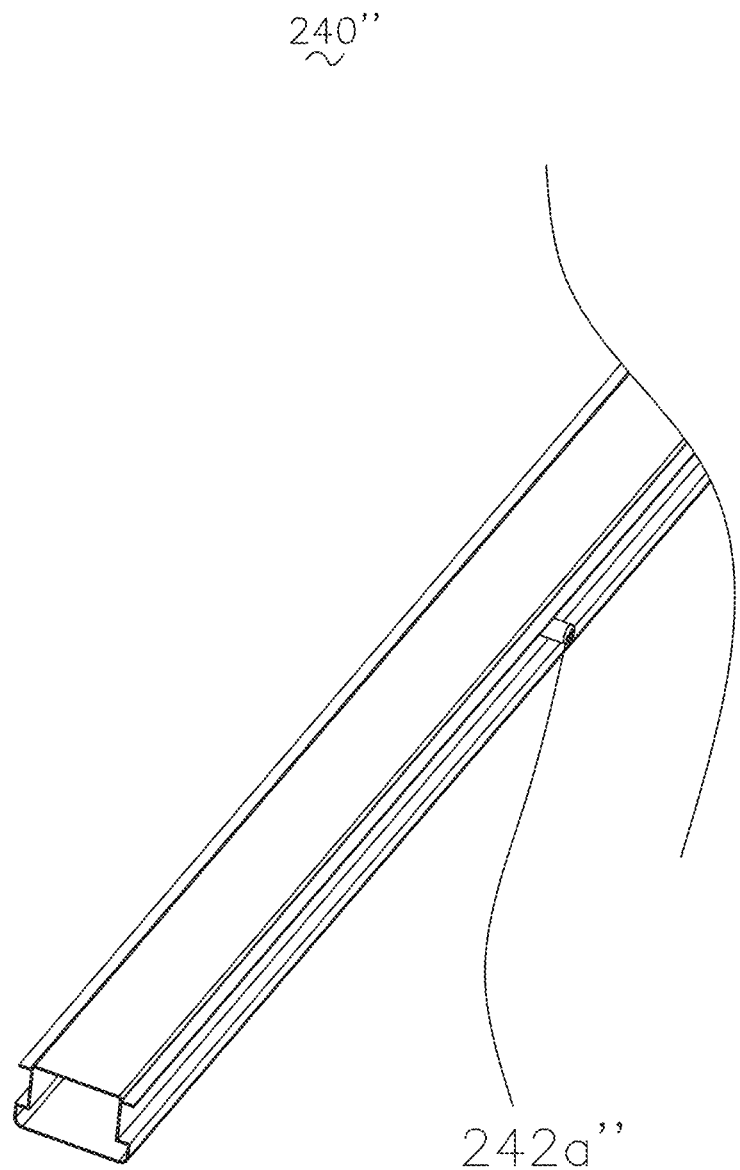
FIG. 28 is an illustrative isometric view of a reinforcing member of the puzzle platform shown in FIG. 25.
Figure 29:
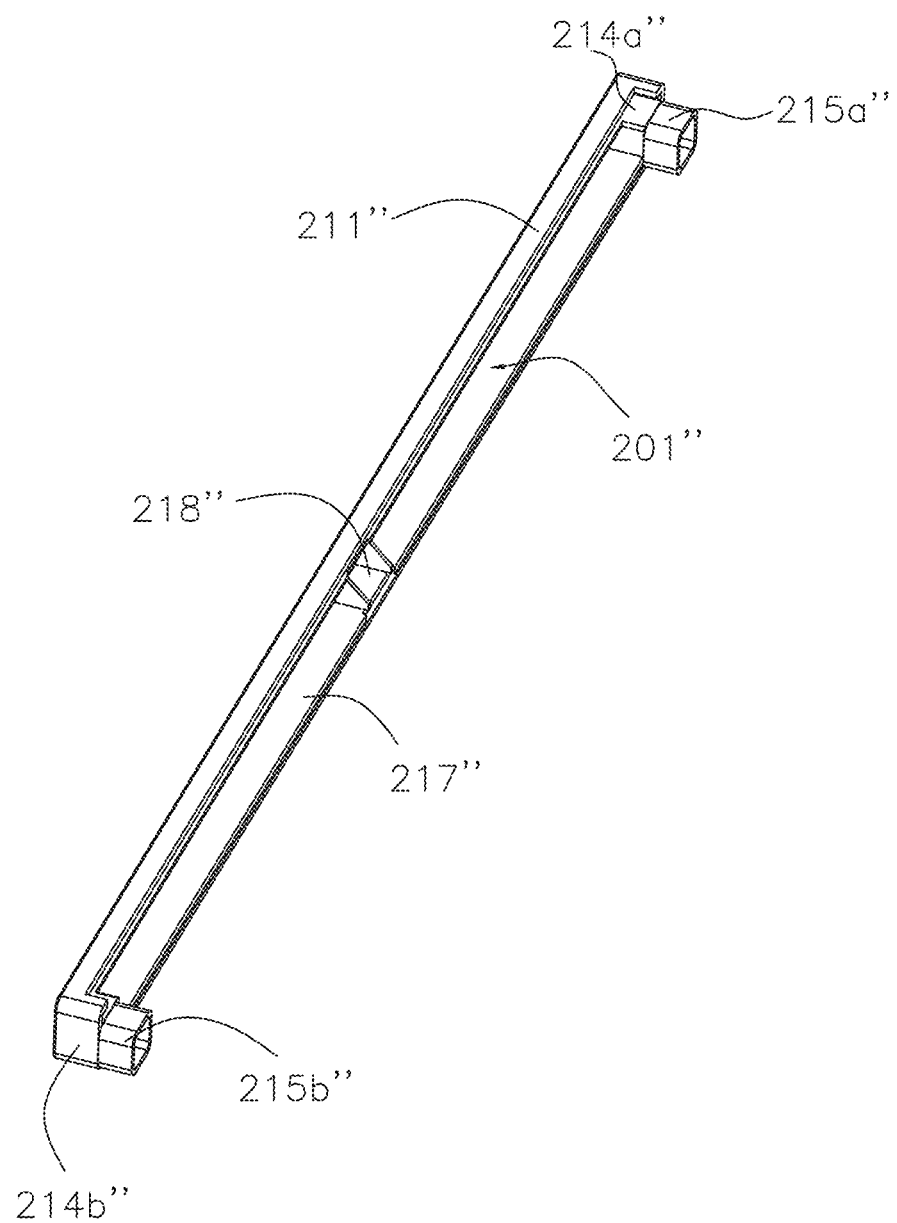
FIG. 29 is an illustrative isometric view of a supporting member of the puzzle platform shown in FIG. 25.

Each of the coupling members 25' has a coupling slot 253' formed thereon to detachably couple at the base 600' by inserting screws 254' through the corresponding coupling slot 253' to the base 600'. It is worth mentioning that a plurality of screw holes 601' formed at the base 600', such that the screws 254' can engage with the screw holes 601' through the corresponding coupling slot 253' to couple the base 600' at the puzzle plate 120'. Referring to FIG. 22, the base 600' is completely received in an inner periphery of the support assembly 200' and do not expose from the openings 201'. It's optional that the base 600' can be omitted and the rotating assembly 500' is directly attached on the support assembly 200'.

Turning back to FIGS. 1-18, the first extending member 220 comprises a first engaging frame 221, a first clamping structure 222 extending from the first engaging frame 221 configured to fix the fixing portion 140 of the puzzle plate 120 cooperatively with the first engaging frame 221, and a first fixing structure 227 extending from the first engaging frame 221 for fixing the base 600. The first engaging frame 221 includes a first upper fixing wall 2211 supporting a bottom of the fixing potion 140, a first lower fixing wall 2212 spaced apart from the first upper fixing wall 2211 and opposite to the first upper fixing wall 2211, a first inner wall 2213 connected the first upper fixing wall 2211 and the first lower fixing wall 2212, and a first outer wall 2214 connected the first upper fixing wall 2211 and the first lower fixing wall 2212. The first engaging frame 221 further includes a first engaging groove 225 surrounded by the first upper fixing wall 2211 together with the first lower fixing wall 2212, the first inner wall 2213 and the first outer wall 2214 for being engaged with the first engaging portion 215a of the supporting member 210. In this embodiment, each of the supporting member 210 is detachably inserted into the first extending member 220 and the second extending member 230. The first upper fixing wall 2211 is closer to a center of the puzzle board 100 than the first inner wall 2213 for fixing the puzzle board 100 firmly. The first lower fixing wall 2212 is closer to a center of the puzzle board 100 than the first inner wall 2213 for fixing the base 600 firmly.

The first extending member 220 and the extending member 230 further comprises at least one third guiding rail 223 at a side adjacent to the one of the puzzle drawers 300 and humps 224 protrudes from the first upper fixing wall 2211 of the first engaging frame 221 and the second upper fixing wall 2311 of the second engaging frame 231, respectively. The puzzle plate 120 is rested on the humps 224 and in contact with the first clamping structure 222 and the second clamping structure 232.

The first clamping structure 222 extends from the first upper fixing wall 2211 for fixing the fixing portion 140 of the puzzle plate 120 cooperatively with the first upper fixing wall 2211 of the first engaging frame 221. The first clamping structure 222 comprises a first clamping wall 2221 extends from the first upper fixing wall 2211 and connected to the first outer wall 2214, a second clamping wall 2222 connected to the first clamping wall 2221 and spaced apart from the first upper fixing wall 2211 of the first engaging frame 221, and a third clamping wall 2223 bent from the second clamping wall 2222 in a direction close to the first upper fixing wall 2211 of the first engaging frame 221 for forming a first fixing space 2224 together with the first upper fixing wall 2211, the first clamping wall 2221 and second clamping wall 2222. The fixing portion 140 of the puzzle plate 120 is sandwiched between the third clamping wall 2223 and the first upper fixing wall 2211 of the first engaging frame 221 and embedded in the first fixing space 2224, so that the puzzle plate 120 is fixedly arranged inside the support assembly 200.

The second extending member 230 comprises a second engaging frame 231, a second clamping structure 232 extending from the second engaging frame 231 configured to fix the fixing portion 140 of the puzzle plate 120 cooperatively with the second engaging frame 231, and a second fixing structure 237 extending from the second engaging frame 231 for fixing the base 600. The second engaging frame 231 includes a second upper fixing wall 2311 supporting a bottom of the fixing potion 140, a second lower fixing wall 2312 spaced apart from the second upper fixing wall 2311 and opposite to the second upper fixing wall 2311, a second inner wall 2313 connected the second upper fixing wall 2311 and the second lower fixing wall 2312, and a second outer wall 2314 connected the second upper fixing wall 2311 and the second lower fixing wall 2312. The second engaging frame 231 further includes a second engaging groove 226 surrounded by the second upper fixing wall 2311 together with the second lower fixing wall 2312, the second inner wall 2313 and the second outer wall 2314 for being engaged with the second engaging portion 215b. In this embodiment, each of the supporting member 210 is detachably inserted into the first extending member 220 and the second extending member 230. The second upper fixing wall 2311 is closer to a center of the puzzle board 100 than the second inner wall 2313 for fixing the puzzle board 100 firmly. The second lower fixing wall 2312 is closer to a center of the puzzle board 100 than the second inner wall 2313 for fixing the base 600 firmly.

It's optional that the first abutting portion 214a and the second abutting portion 214b can be omitted. A first engaging portion 215a extends from the first side wall 213a for being engaged with the first engaging groove 225 of the first extending member 220. The second engaging portion 215b extending from the second side wall 213b for being with the second engaging groove 226 of the second extending member 230.

The second clamping structure 232 extends from the second upper fixing wall 2311 for fixing the fixing portion 140 of the puzzle plate 120 cooperatively with the second upper fixing wall 2311 of the second engaging frame 231. The second clamping structure 232 comprises a fourth clamping wall 2321 connected to the second upper fixing wall 2311 of the second engaging frame 231, a fifth clamping wall 2322 connected to the fourth clamping wall 2321 and spaced apart from the second upper fixing wall 2311 of the second engaging frame 231, and a sixth clamping wall 2323 bent from the fifth clamping wall 2322 in a direction close to the second upper fixing wall 2311 of the second engaging frame 231 for forming a second fixing space 2324 together with the fourth clamping wall 2321 and the fifth clamping wall 2322. The fixing portion 140 of the puzzle plate 120 is sandwiched between the sixth clamping wall 2323 and the second upper fixing wall 2311 of the second engaging frame 231 and received in the second fixing space 2324.

Referring to FIGS. 6-14, a periphery of the first abutting portion 214a abuts against peripheries the first clamping structure 222 and the first upper fixing wall 2211 of the first engaging frame 221, directly. A periphery of the second abutting portion 214b abuts against peripheries the second clamping structure 232 and the second upper fixing wall 2311 of the second engaging frame 231, directly. The first engaging portion 215a is detachably inserted into the first engaging groove 225 of the first engaging frame 221 and is not exposed from the supporting member 210 and the first extending member 220. An outer wall of the first engaging portion 215a is engaged with an inner wall of the first engaging frame 221. The second engaging portion 215b is detachably inserted into the second engaging groove 226 of the second engaging frame 231 and is not exposed from the supporting member 210 and the second extending member 230. An outer wall of the second engaging portion 215b is engaged with an inner wall of the second engaging frame 231.

The support assembly 200 further comprises a reinforcing member 240 disposed below the puzzle board 100 and located between the first extending member 220 and the second extending member 230. When assembled, the partition wall 212 is engaged with the reinforcing member 240 to divide the receiving space 3 into drawer cavities 301. The drawer cavities 301 are in one-to-one correspondence with the puzzle drawers 300 and configured to at least partially receive the puzzle drawers 300. It will be understood that in some embodiments, the reinforcing member 240 can be omitted.

The board assembly 2 has four puzzle drawers 300 received in the corresponding drawer cavity 301. The storing capacity of drawers vary as per varying sizes of the puzzle pieces 10. In this embodiment, the support assembly 200 is configured not only for improving the structural strength of the board assembly 2, but also for forming the drawer cavities 301 together with the puzzle plate 120. The four puzzle drawers 300 are formed at the transverse sides of the puzzle board 100 respectively. Particularly, a first puzzle drawer 302 and a second puzzle drawer 303 are spacedly formed at each of the transverse sides of the puzzle board 100. A third puzzle drawer 304 and a fourth puzzle drawer 305 are spacedly formed at each of the other transverse sides of the puzzle board 100. In other words, two corresponding puzzle drawers 300 are slidably coupled at each of the transverse sides of the puzzle board 100. Therefore, four puzzle drawers 300 are slidably coupled at the transverse sides of the puzzle board 100. It is worth mentioning that each puzzle drawer 300 is independently actuated to slide in-and-out of the corresponding drawer cavity 301 through the corresponding the opening 201. Since the puzzle drawers 300 are slidably coupled at the transverse sides of the puzzle board 100, each puzzle drawer 300 is relatively long enough and each drawer cavity 301 is deep enough to retain the puzzle drawer 300 therein so as to prevent the puzzle drawer 300 being slid out of the drawer cavity 301 accidentally or unintentionally. Accordingly, a length of each puzzle drawer is slightly smaller than half of the length of the puzzle board between the transverse sides thereof.

Figure 10:
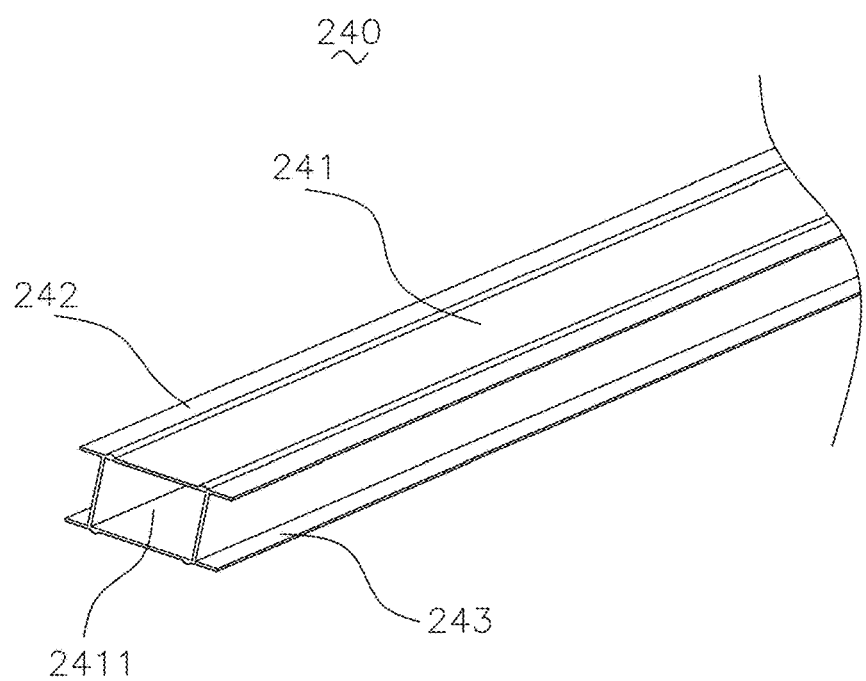
FIG. 10 is an illustrative isometric view of a reinforcing member of the puzzle platform shown in FIG. 1.
Figure 11:
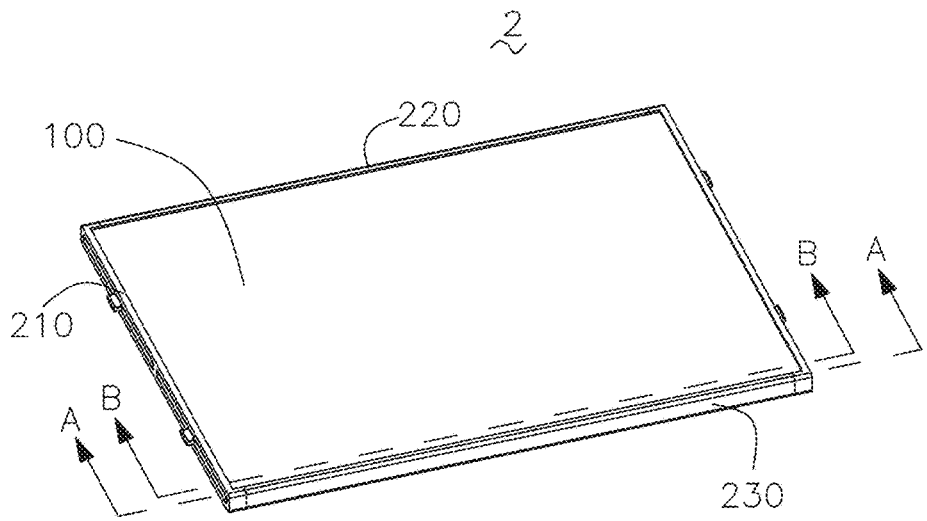
FIG. 11 is an illustrative isometric view of the puzzle platform shown in FIG. 1.
Figure 12:
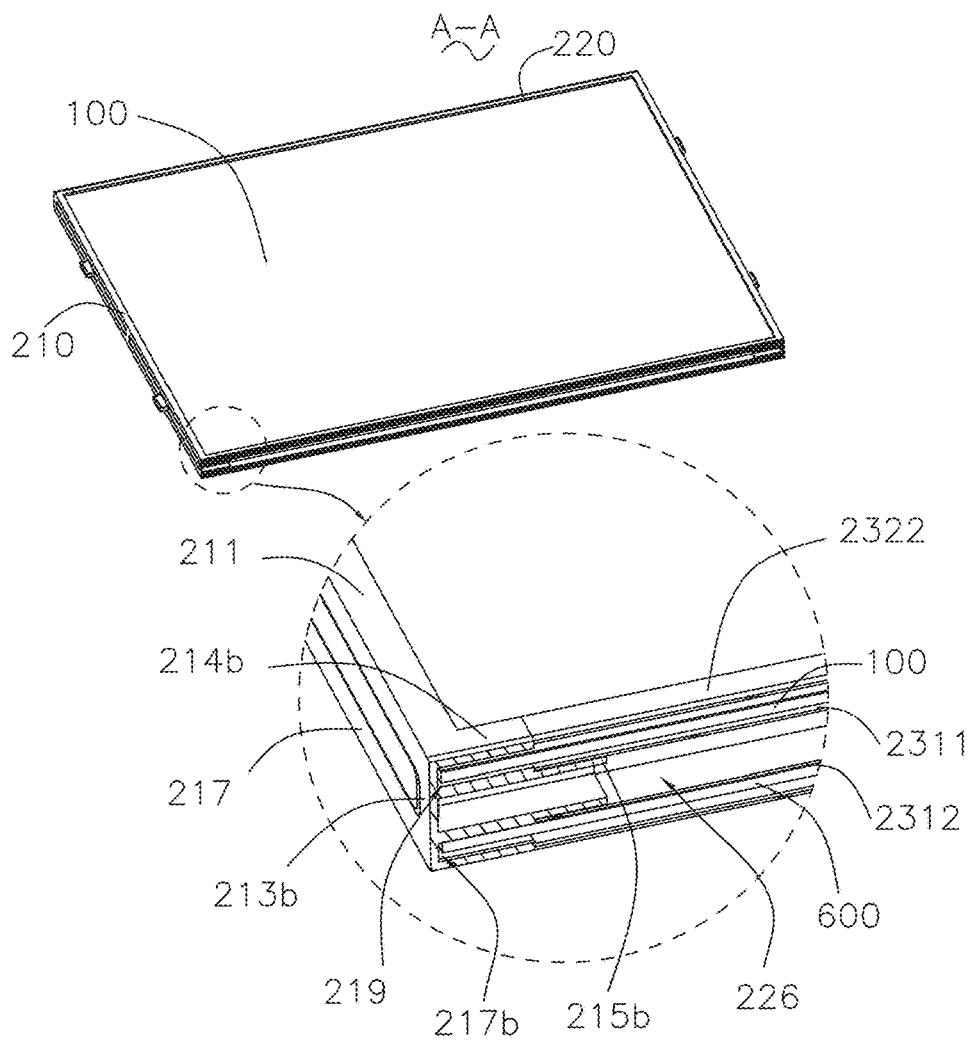
FIG. 12 is a cross-sectional view of the puzzle platform taken along line A-A of FIG. 11.
Figure 13:
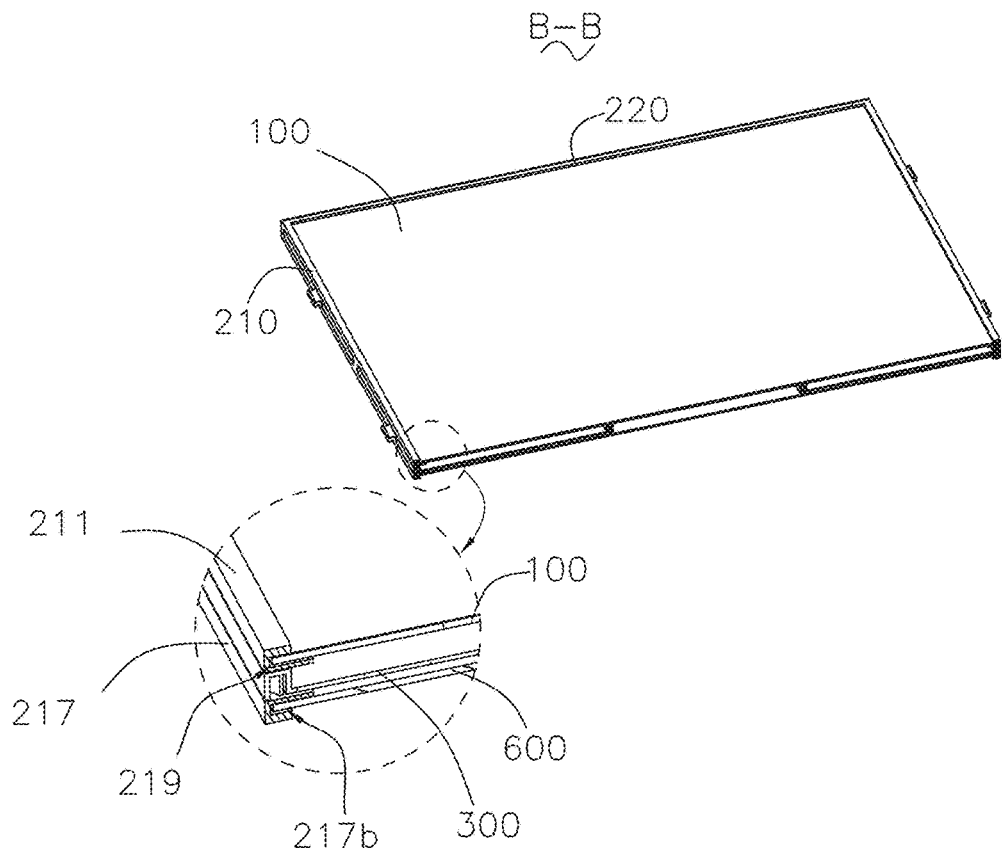
FIG. 13 is a cross-sectional view of the puzzle platform taken along line B-B of FIG. 11.
Figure 14:
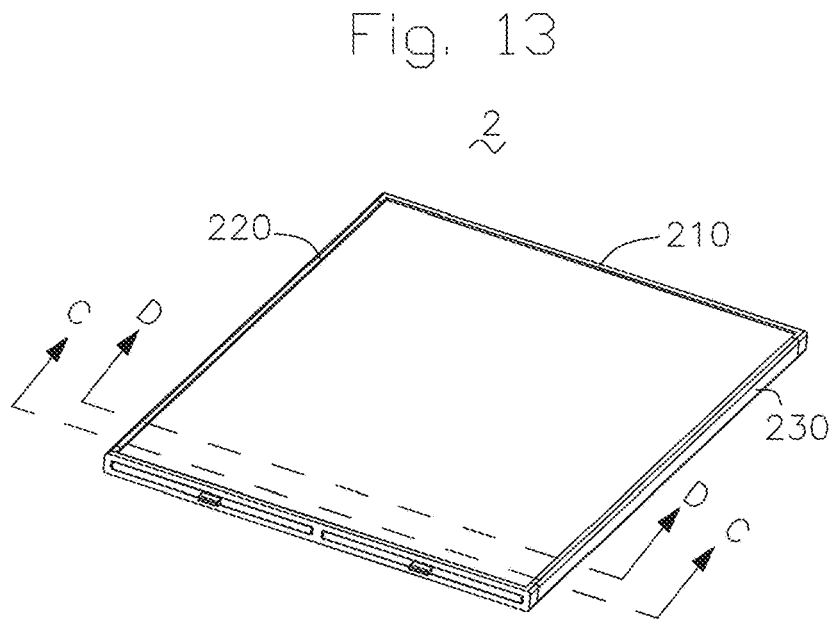
FIG. 14 is an illustrative isometric view of the puzzle platform shown in FIG. 1, but from another aspect.
Figure 15:
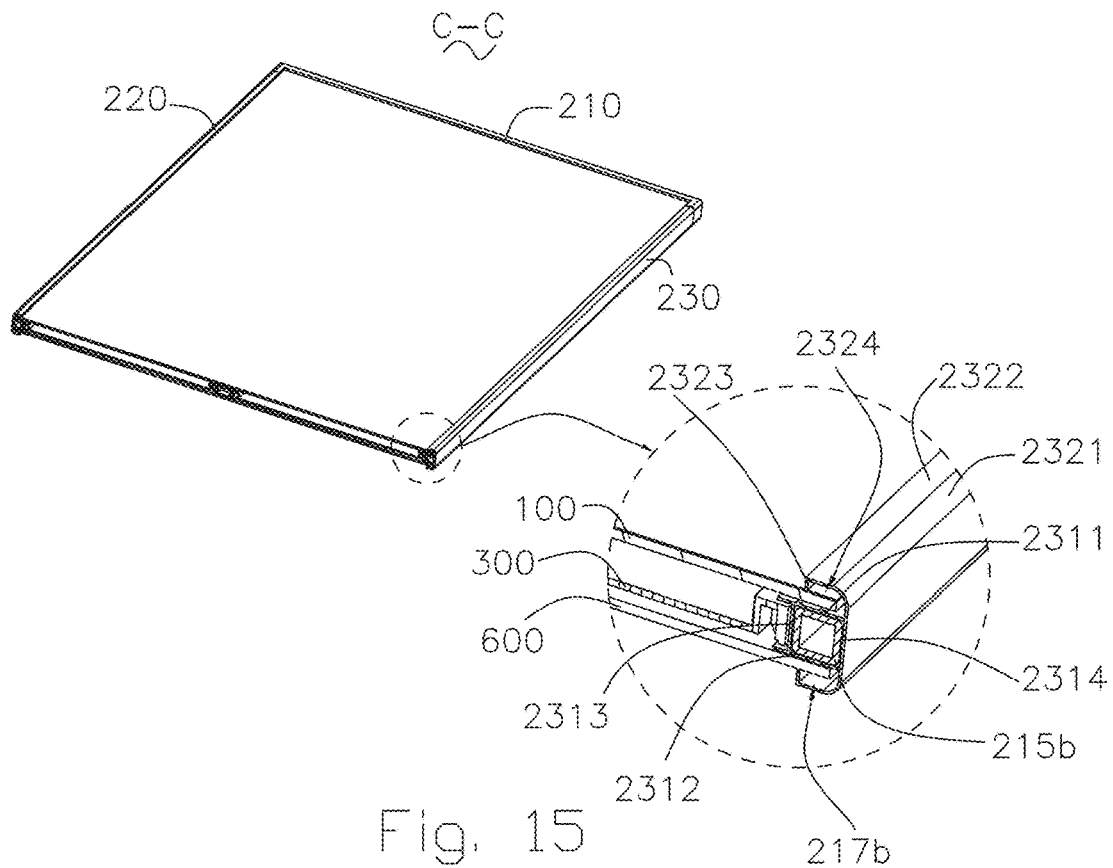
FIG. 15 is a cross-sectional view of the puzzle platform taken along line C-C of FIG. 14.
Figure 16:
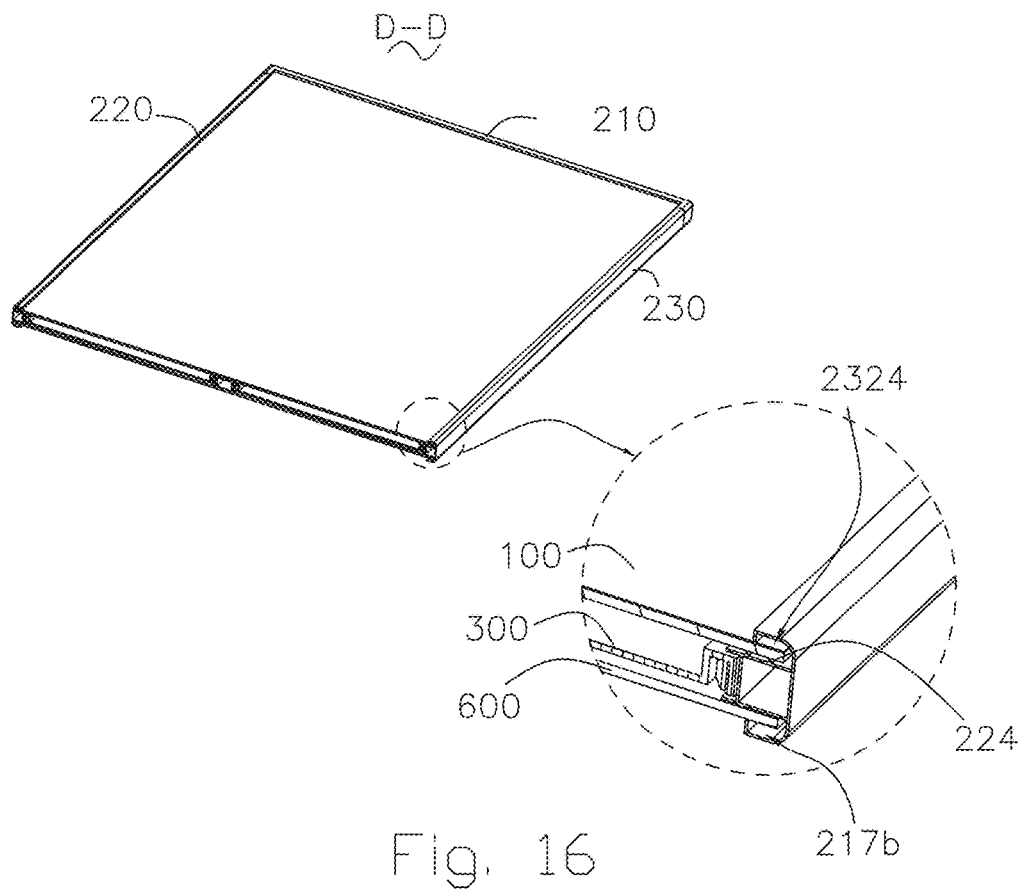
FIG. 16 is a cross-sectional view of the puzzle platform taken along line D-D of FIG. 14.
Figure 17:
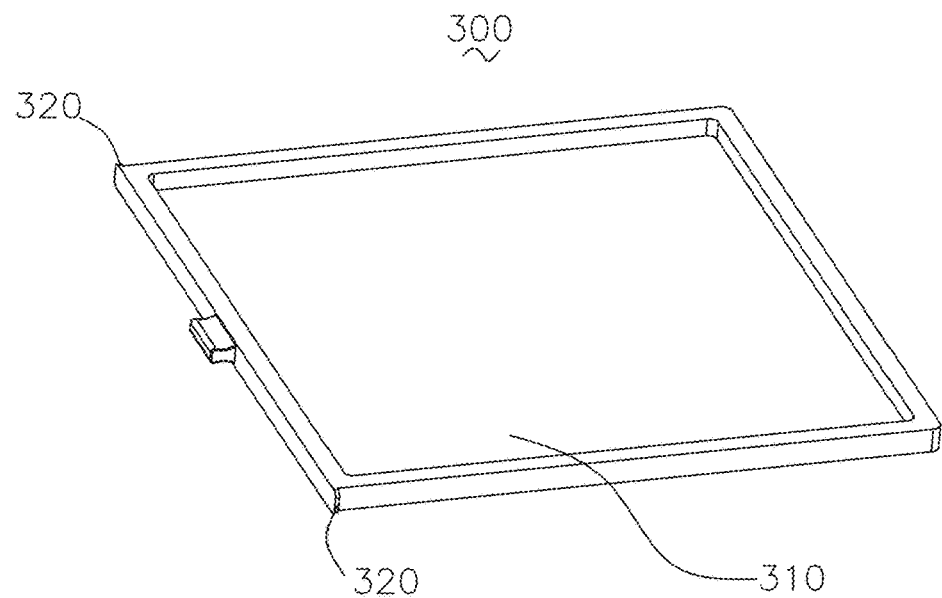
FIG. 17 is an illustrative isometric view of a puzzle drawer of the puzzle platform shown in FIG. 1.
Figure 18:
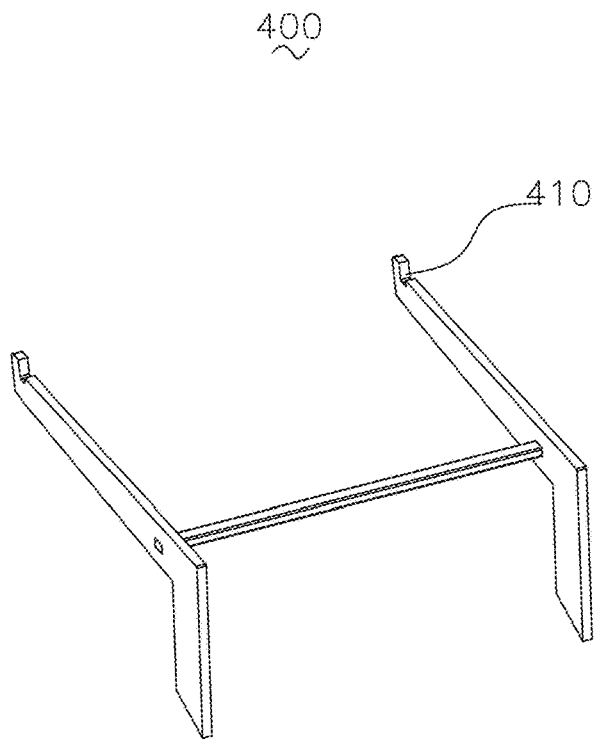
FIG. 18 is an illustrative isometric view of a bracket of the puzzle platform shown in FIG. 1.
Figure 19:
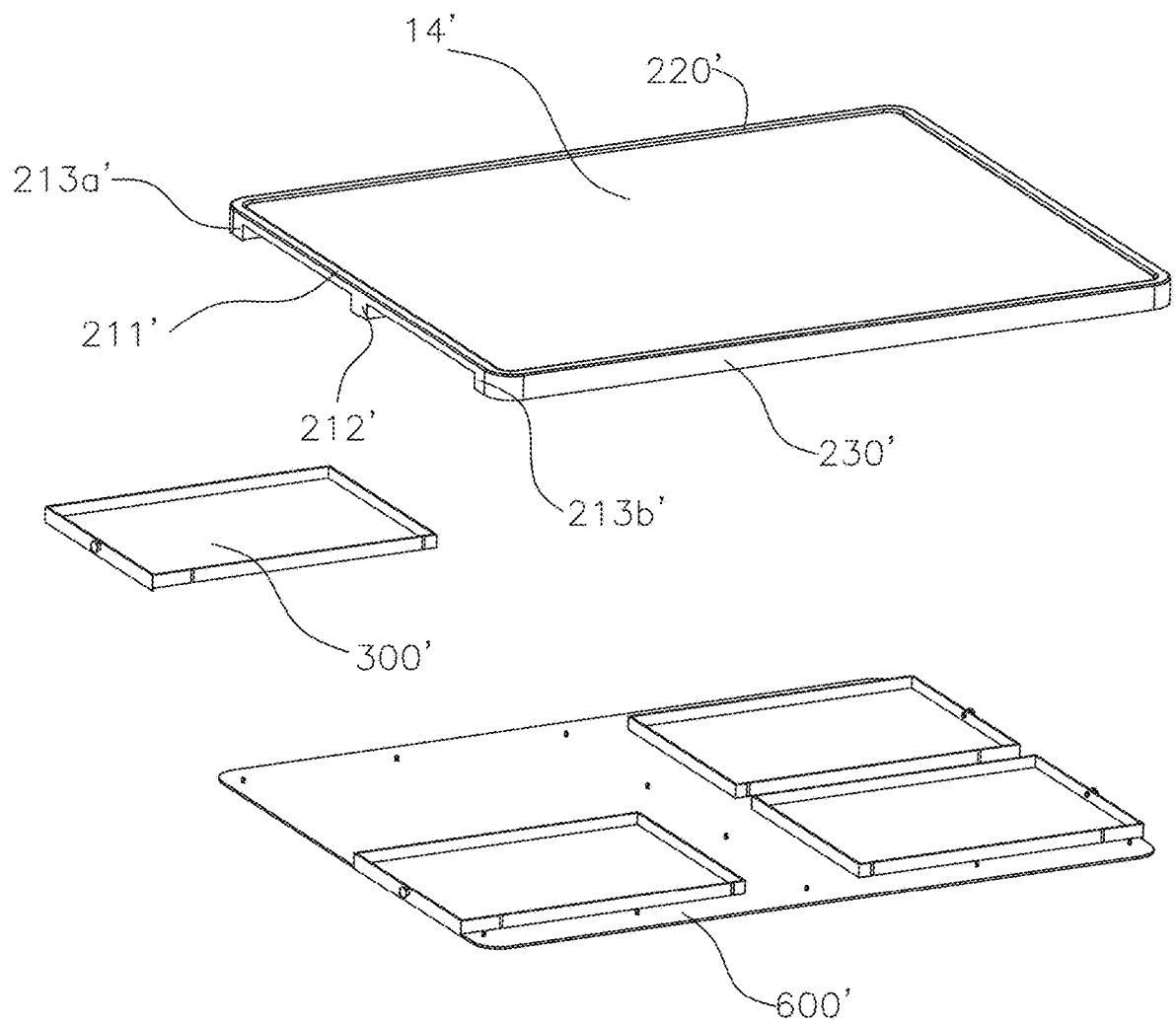
FIG. 19 is a partly exploded perspective view of a puzzle platform illustrating another mode of a board assembly.
Figure 20:
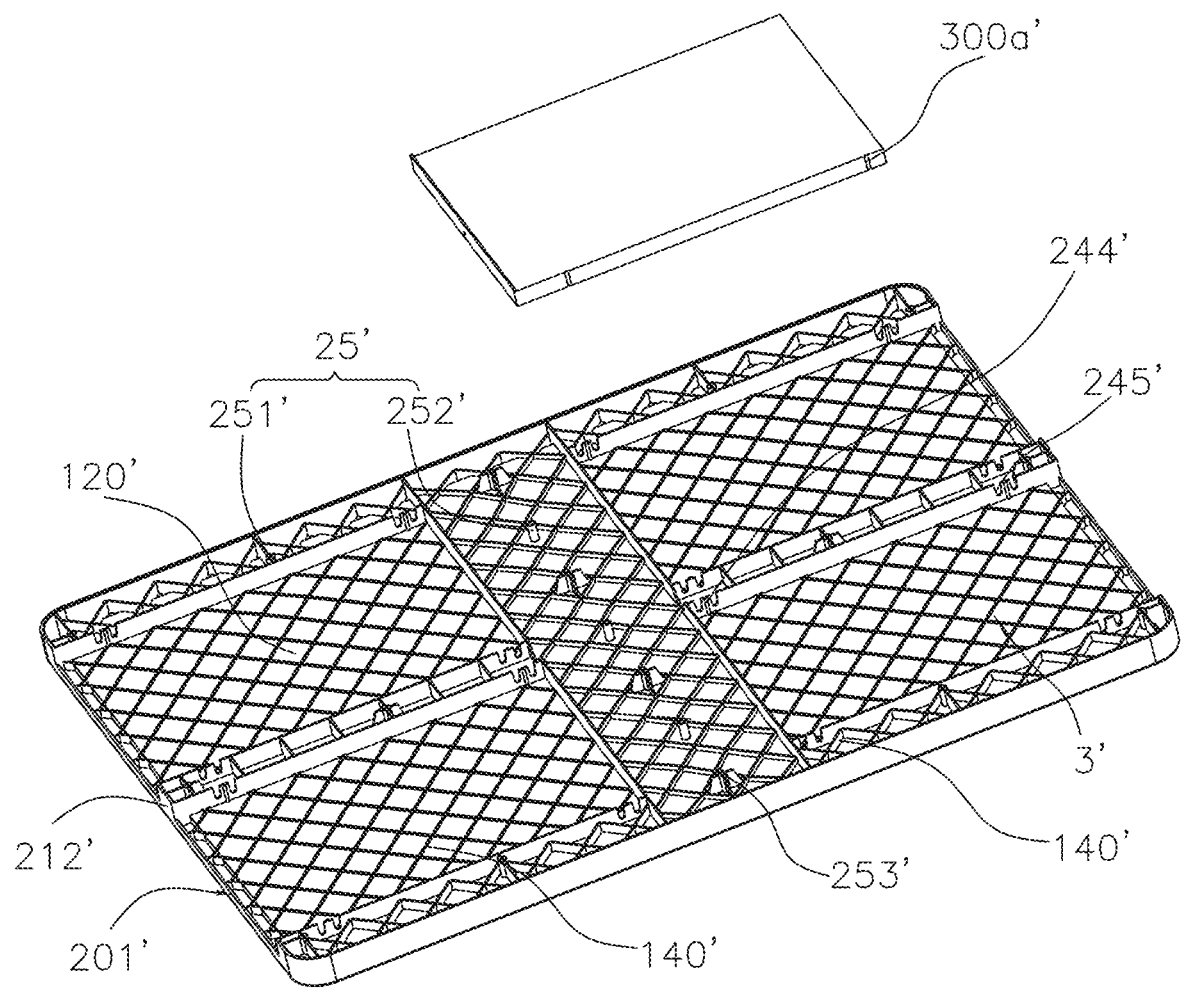
FIG. 20 is a partly exploded perspective view of a board assembly of the puzzle platform shown in FIG. 13 and a base and a part of drawers thereof being removed away, but from another aspect.
Figure 21:
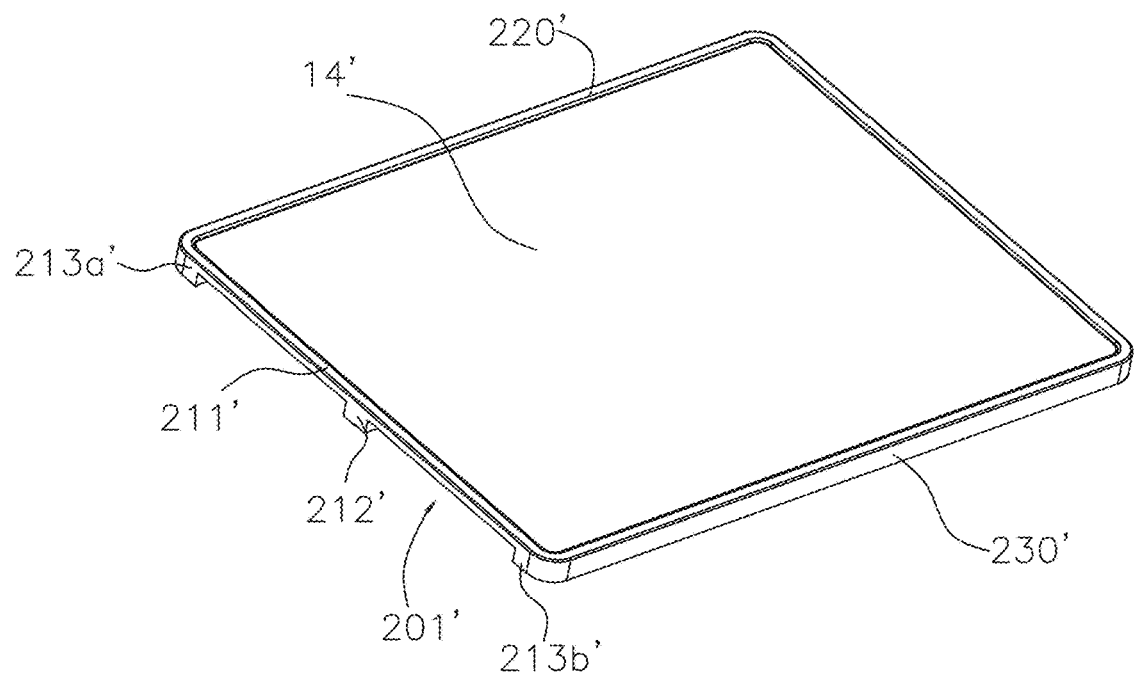
FIG. 21 is an illustrative isometric view of a board assembly of the puzzle platform shown in FIG. 13 and a base thereof being removed away.

Each of the puzzle drawers 300 comprises a drawer body 310 and at least one tab 320 extending from an end of the drawer body 310. Each of the puzzle drawers 300 is switchable between an extending state in which the drawer body 310 of each puzzle drawer 300 extends out of the drawer cavity 301 and an accommodating state in which the drawer body 310 of each puzzle drawer 300 is received in the drawer cavity 301. The board assembly 2 further comprises recesses 2130 arranged on the first side wall 213a, the second side wall 213b and the partition wall 212, respectively. When the puzzle drawer 300 is in the accommodating state, the tab 320 of the puzzle drawer 300 abuts against the recess 2130. Referring to FIG. 10, in order to support the puzzle drawers 300 and actuate the puzzle drawers 300 easily and smoothly, the reinforcing member 240 comprises a first guiding rail 242 adjacent to the first and third puzzle drawers 302, 304 and a second guiding rail 243 adjacent to the second and fourth puzzle drawers 303, 305.

Referring to FIGS. 6-10, the reinforcing member 240 comprises a reinforcing frame 241 having a reinforcing groove 2411 engaged with each of the partition wall 212. The first guiding rail 242 and the second guiding rail 243 are disposed at two opposite sides of the reinforcing member 240. The supporting member 210 further comprises a first inserting portion 216 disposed at a side of the partition wall 212 facing the reinforcing member 240, and the inserting portion 216 is detachably inserted into the reinforcing groove 2411 of the reinforcing member 240.

Each of the supporting member 210 further comprises an upper channel 219 formed continuously along an inner periphery 20 thereof and provided on the upper part 4, which the upper channel 219 is adapted to cooperate with the first fixing space 2224 and the second fixing space 2324 to fix the puzzle board 100 firmly. Accordingly, each of the supporting member 210 may be installed about the puzzle board 100 by inserting the fixing portion 140 within the upper channel 219. The inner periphery 20 of each of the supporting member 210 comprises a lower inner periphery 21 disposed below the puzzle board 100 and an upper inner periphery 22 spaced apart from the lower inner periphery 21. The lower inner periphery 21 of each of the supporting member 210 is closer to a center of the puzzle board 100 than the upper inner periphery 22 of each of the supporting member 210 for fixing the puzzle board 100 firmly.

The top wall 211 is adapted to cooperated with the first and second abutting portions 214a, 214b to form the upper part 4. The upper channel 219 is arranged on the upper part 4. The first inserting portion 216 is adapted to cooperated with the first and second side walls 213a, 213b, and the first and second engaging portion 215a, 215b to form the middle part 5. The lower part 6 has the same structure as the upper part 4. The bottom wall 217 is arranged on the lower part 6. The lower part 6 further comprises a lower channel 217b to receive and fix the base 600 firmly.

In this embodiment, the board assembly 2 comprises a complementary conformation provided between each of the supporting members 210, the first extending member 220 and the second extending member 230 for fixing each of the supporting members 210 on the first extending member 220 and the second extending member 230 firmly. Optionally, the engaging portions 215a, 215b are arranged on the first extending member 220 and the second extending member 230 and the engaging grooves 225, 226 are arranged on each of the supporting member 210, thereby each of the supporting members 210 is detachably inserted into the first extending member 220 and the second extending member 230.

Referring to FIGS. 25-29, in a third mode of a board assembly 2" of a puzzle platform 1", a supporting member 210" comprises an inserting groove 218" disposed at a side of a partition wall 212" facing a reinforcing member 240", and the reinforcing member 240" comprises a second inserting portion 246" extending from a reinforcing frame 241" and detachably inserted into the inserting groove 218". Comparing with the first mode of board assembly 2, the reinforcing groove 2411 can be replaced with the second inserting portion 246" and the first inserting portion 216 can be replaced with the inserting groove 218".

The support assembly 200" further comprises a first stopping element 242a" disposed on the reinforcing member 240" and facing puzzle drawers 300". Particularly, the first stopping element 242a" disposed on the first guiding rail 242" and second guiding rail 243". When the puzzle drawer 300" is in the accommodating state, the puzzle drawers 300" abut against the first stopping element 242a". Further, A first extending member 220" and a second extending member 230" further comprises a second stopping elements 242b" facing the puzzle drawers 300". When the puzzle drawer 300" is in the accommodating state, the puzzle drawers 300" abut against the second stopping element 242b". That is, the first and second stopping elements 242a", 242b" are configured to limit the displacements of the corresponding puzzle drawers 300".

Turning back to FIGS. 1-18, the bracket 400 is detachably connected to the support assembly 200. The bracket 400 comprises a notch 410 facing the support assembly 200 and the support assembly 200 is partially received in the notch 410.

The rotating assembly 500 comprises a first moving member 501 coupled at board assembly 2 and a second moving member 502 rotatably coupled to the first moving member 501. It is worth mentioning that the rotating assembly 500 is preferred to be coupled coaxially with a center of gravity of the board assembly 2, for example at a center portion of the board assembly 2, such that the board assembly 2 can be moved on the playing place in a balancing manner. In this embodiment, the rotating assembly 500 is detachably coupled at the base 600 and disposed apart from the bracket 400.

According to this embodiment of the present invention, the board assembly 2 is adapted for being self-rotated 360° on the playing place via a rotation movement between the first and second moving members 501, 502. In other words, the user is able to selectively rotate the board assembly 2 from one longitudinal side to another opposed longitudinal side or to any one of the shorter transverse sides without walking around the board assembly 2. For example, the user is able to assemble one puzzle piece 10 at one side of the board assembly 2 and to rotate the board assembly 2 at 180° in order to assembly another puzzle piece 10 at an opposed side of the board assembly 2, so as to speed up the assembling time of the puzzle pieces 10. It should be understood that a rotating angle of the puzzle board 100 can be adjusted to be smaller than 360°.

The base 600 is assembled with the support assembly 200 for supporting the board assembly 2 on the playing place such as a table surface, a wall surface, a floor surface, and the like or even a support frame for supporting the board assembly 2 on ground. The base 600 is generally the type of one-piece with a whole entirety platy shape and have a rectangular shape for matching and covering the support assembly 200. The base 600 disposed below the puzzle drawers 300 and a periphery of the base 600 is clamped by the support assembly 200. It will be understood that in some embodiments, the guiding rails 242, 243, 223 can be omitted and the bottom of each of the puzzle drawers 32 is mounted on the base 600 and slid on the base 600 directly. So, the base is configured not only holding the puzzle drawer and preventing the puzzle drawer from falling off the supporting portion, but also for allowing each of the puzzle drawer to be slid in-and-out of the corresponding drawer cavity. The base 600 is stacked on the support assembly 200 by suitable chemical or mechanical methods such as but not limited to glue or wood screws. Optionally, a base is integral with at least a part of the support assembly 200 as a whole for forming a stable and reliable structure. For example, the base is integral with the bottom wall 217 of the supporting member 210.

The puzzle board 100 and/or the support assembly 200 are/is made of plastic, wood, or metal. When the support assembly 200 is made of plastic by molding, the partition wall 212 is integral with the top wall 211, such that each of the supporting member 210 is a monolithic structure and is detachably inserted into the corresponding extending members 220, 230, which makes the assembling process much easier, the service life of the device is increased, the support force applied on the puzzle plate is increased, thereby greatly reducing material cost and assembly cost. It's optional that each of the supporting member 210 are integrated with the corresponding extending members 220, 230 to form a one-piece structure. Particularly, the puzzle board 100 is preferred to be integrally molded on the support assembly 200 as a whole.

When the first extending member 220 and/or the second extending member 230 are/is made of metal by stamping, the first and second extending member 220, 230 are preferred to be integrally molded as a whole, respectively. If the first extending member 220 and/or the second extending member 230 are/is made of aluminum, the weight of the puzzle platform 1 can be reduced. If first extending member 220 and/or the second extending member 230 are/is made of stainless steel or tempered steel, the structural strength of the puzzle platform 1 can be improved. Meanwhile, the puzzle board 100 and each of the supporting member 210 are/is made of plastic by molding. Each of the supporting member 210 is a monolithic structure and is detachably inserted into the corresponding extending members 220, 230. If the first extending member 220 is made of plastic or wood, comparing with metal, the manufacturing cost of the puzzle platform 1 can be reduced. The second extending member 230 has the same structure and material as the first extending member 22.

The first extending member 220 and the second extending member 230 are detachably inserted into both ends of the supporting member 210 to form a stable frame structure. The puzzle board 1 are set to be mutually removable and installable, such a setup can facilitate the transportation of the puzzle platform 1 in a disassembled form, and be installed by the user to form a product after receipt of the goods, thereby saving the space occupied by the puzzle platform 1 in the transportation process, and thus saving the transportation cost; furthermore, the user can disassemble the puzzle platform 1 provided by the present embodiment when it is not in use, thereby saving the space occupied by the puzzle platform 1.

In another aspect, the support assembly 200 are manufactured by injection molding to form a one-piece structure for improving the mechanical strength of the board assembly 2 and reducing assembly cost. Optionally, each of the supporting member may also be formed wholly or partially integrally, thereby providing structural stability of the board assembly 2.

In the other aspect, the puzzle plate 120 is integral with the support assembly 200 to form a one-piece structure, thereby improving the mechanical strength of the board assembly 2 and reducing assembly cost.

It's optional that each of the pair of extending members comprises a first connection portion detachably inserted with a corresponding one of the side walls and a second connection portion detachably inserted with the first connection portion.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A puzzle platform, comprising:
a puzzle board, having a playing portion configured for playing a plurality of puzzle pieces thereon; and
a support assembly, configured to support the puzzle board and comprising a supporting member which comprises:
an upper part, configured to receive the puzzle board; and
a middle part integrally extending from the upper part and positioned below the puzzle board for supporting the puzzle board together with the upper part;
wherein the support assembly further comprises a first extending member and a second extending member spaced apart from the first extending member in an extension direction of the supporting member; and
wherein the middle part of the supporting member further comprises:
a first side wall, connected to the upper part and the first extending member;
a second side wall, connected to the upper part and the second extending member; and a partition wall, connected to the upper part and spaced apart from the first and second side walls.

2. The puzzle platform as claimed in claim 1, wherein the middle part of the supporting member further comprises a first engaging portion extending from the first side wall; the first extending member comprises a first engaging frame disposed below the puzzle board and engaged with the first engaging portion.

3. The puzzle platform as claimed in claim 2, wherein the supporting member further comprises a first abutting portion positioned between the first side wall and the first engaging portion, and abutting against the first extending member.

4. The puzzle platform as claimed in claim 1, wherein the first extending member is integral with the first side wall, and the second extending member is integral with the second side wall to form a one-piece structure.

5. The puzzle platform as claimed in claim 1, wherein the puzzle board comprises a puzzle plate supported on the support assembly; and wherein the puzzle plate, the first extending member, the second extending member, the upper part, and the middle part are integrated with each other to form a monolithic structure.

6. The puzzle platform as claimed in claim 1, wherein the support assembly further comprises a reinforcing member, the reinforcing member is disposed below the puzzle board and located between the first extending member and the second extending member, the reinforcing member comprises a reinforcing frame engaged with the partition wall.

7. The puzzle platform as claimed in claim 1 further comprises at least two puzzle drawers, the support assembly further comprises a reinforcing member disposed below the puzzle board and located between the first extending member and the second extending member and a first stopping element disposed on the reinforcing member at a side facing a corresponding puzzle drawer, the puzzle drawers abut against the first stopping element in an accommodating state.

8. The puzzle platform as claimed in claim 1 further comprises at least two puzzle drawers, the support assembly further comprises a reinforcing member disposed below the puzzle board and located between the first extending member and the second extending member, the reinforcing member comprises limiting bars, and each corresponding puzzle drawer comprises a limiting groove matching with a corresponding limiting bar.

9. The puzzle platform as claimed in claim 1 further comprises at least two puzzle drawers, each of the puzzle drawers comprises a drawer body and a tab extending from the drawer body, and the supporting member further comprises a recess for accommodating the tab.

10. The puzzle platform as claimed in claim 1, wherein the supporting member further comprises:

a bottom wall, spaced apart from the top wall;
a first side wall, connected to both the bottom wall and the upper part at an end of the upper part; and
a second side wall, connected to both the bottom wall and the upper part at an opposite end of the upper part;
wherein the bottom wall is integral with the partition wall, the first side wall, and the second side wall.

\* \* \* \* \*